(12) United States Patent
Theeten

(10) Patent No.: US 6,968,553 B1
(45) Date of Patent: *Nov. 22, 2005

(54) ELEMENT MANAGER COMMON GATEWAY ARCHITECTURE SYSTEM AND METHOD

(75) Inventor: Bart A. Theeten, Raleigh, NC (US)

(73) Assignee: Alcatel, Paris (FR)

( * ) Notice: Subject to any disclaimer, the term of this patent is extended or adjusted under 35 U.S.C. 154(b) by 542 days.

This patent is subject to a terminal disclaimer.

(21) Appl. No.: 09/797,088

(22) Filed: Mar. 1, 2001

(51) Int. Cl.[7] .............................................. G06F 3/00
(52) U.S. Cl. ...................... 719/311; 719/328; 709/223; 715/700
(58) Field of Search ................ 709/311, 328, 310, 709/223, 228–230, 203, 220; 370/465; 719/311, 719/328; 715/700, 749, 762

(56) References Cited

U.S. PATENT DOCUMENTS

| | | | |
|---|---|---|---|
| 5,764,955 A | 6/1998 | Doolan | |
| 5,961,594 A | 10/1999 | Bouvier, et al. | |
| 6,003,087 A * | 12/1999 | Housel et al. | 709/229 |
| 6,028,984 A * | 2/2000 | Kimball | 709/249 |
| 6,457,050 B1 * | 9/2002 | Cowan et al. | 709/224 |
| 6,507,589 B1 * | 1/2003 | Ramasubramani et al. | 370/465 |
| 6,549,952 B1 * | 4/2003 | Plassmann et al. | 709/311 |
| 6,567,852 B2 * | 5/2003 | Besaw et al. | 709/228 |

FOREIGN PATENT DOCUMENTS

WO    WO 00 76228 A    12/2000

OTHER PUBLICATIONS

1998 Object Management Group (OMG) PDF document "The Common Object Request Broker: Architecture and Specification" at ftp://ftp.omg.org/pub/docs/formal/98-12-01.pdf.

Etheridge, et al.; Distributed Architecture for Cross-Domain Network Management; Network Operations and Management Symposium; IEEE Feb. 15, 1998; pp. 611-616, New Orleans, Louisiana, USA.

* cited by examiner

*Primary Examiner*—St. John Courtenay, III
*Assistant Examiner*—Van H. Nguyen
(74) *Attorney, Agent, or Firm*—Kevin M. Klughart; Craig A. Hoersten; Bobby D. Slaton

(57) ABSTRACT

A common gateway architecture designed to be generic across different types of network elements and different network protocols, permitting network elements to be added incrementally without recompilation of the entire network element manager, thus reducing overall software maintenance overhead.

9 Claims, 30 Drawing Sheets

```
// CGA Interface (1/2)
/**
 * The interface between the protocol independent Element Management System
 * and the protocol dependent gateway/proxy.  There is one object
 * implementing this interface per network element instance.
 **/
public interface CGA
{
    /**
     * Sets the network element address.
     *
     * @param a   the address (IP address or X.25 or serial)
     **/
    public void setAddress(Address a);
    /**
     * Configures this CGA instance for the given NE type and release
     **/
    public void configure(string type, string release);
    /**
     * Establishes a connection with the NE on the address set by setAddress().
     *
     * @exception ProxyCommError for communications problems between proxy
     *                            and network element.
     * @exception ProxyError for any other exception.
     **/
    public void connect()
        throws Exceptions.ProxyError, Exceptions.ProxyCommError;
    /**
     * Closes the connection to the NE.
     **/
    public void disconnect();
```

```
// CGA Interface (2/2)
/**
 * Sends a command to the NE and returns the result as a generic response
 * structure.
 *
 * @param commandId   a (logical) unique identification of the command to
 *                    be executed in the network element.
 * @param entityId    the unique identification of the target object.
 * @param inArgs      the list of arguments for the command.
 * @param outArgs     the list of arguments to be returned in the result.
 * @exception ProxyCommError for communications problems between proxy
 *                    and network element.
 * @exception ProxyError for any other exception.
 **/
public Response sendCommand(String commandId,
        NameAndStringValue[] entityId,
        AttributeValue[] inArgs,
        String[] outArgs)
    throws Exceptions.ProxyError,
        Exceptions.ProxyCommError;

/**
 * Sends a command to the NE to check whether the NE is still responding.
 *
 * @return false when no answer was received.
 **/
public boolean ping();

/**
 * Cleanup of expensive resources.
 **/
public void finalize();
}
```

```
public class Response
{
    /** list of all attribute names **/
    public String[] header;

/** table of attribute values for all objects in the response **/
    public Any[][] fields;

/** list of all object errors **/
    public Error[] recordErrors;

/** global command error **/
    public Error globalError;
}
```

```
public class ModelObject
{
    /** attribute list **/
    protected AttributeValue[] avas_;

/** the object's children **/
    protected Hashtable children_;

/** the object's parent **/
    protected ModelObject parent_;
    ...
};
```

ELEMENT MANAGER COMMON GATEWAY ARCHITECTURE SYSTEM AND METHOD

CROSS REFERENCE TO RELATED APPLICATIONS

This application incorporates by reference U.S. Pat. No. 6,792,608 entitled "NETWORK NAVIGATOR INTERFACE SYSTEM AND METHOD" filed Mar. 1, 2001 by applicant Bart. A. Theeten.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention is related in the general area of network Element Management Systems (EMS) and software techniques which may be used to minimize the maintenance overhead of EMS when responding to changes in network protocols and/or incorporation of new/modified network elements (NE).

As illustrated in FIG. 1, the present invention may have application in situations where there are one or more telecommunications networks (0110, 0120) that may or may not contain equipment from different vendors. The network equipment elements (NE) used within these networks (0115, 0116, 0125, 0126) may take many forms, including but not limited to switch gear, multiplexers, and the like. These network elements (0115, 0116, 0125, 0126) are generally under control of one or more computer systems (0111, 0121) that are controlled by computer software (0112, 0122) that may be stored on a variety of storage media. This computer software generally takes the form of one or more network element managers (0113, 0114, 0123, 0124) that control and monitor the network elements (0115, 0116, 0125, 0126) that comprise constituent components of the telecommunication networks (0110, 0120).

The present invention deals specifically with implementations of the network element manager (0113, 0114, 0123, 0124) as they relate to the overall control and monitoring of the various network elements (0115, 0116, 0125, 0126) within the context of one or more telecommunications networks (0110, 0120).

ABBREVIATIONS AND DEFINITIONS

To minimize the verbosity of this document, a variety of abbreviations and definitions will be provided to aid the reader. This information may be applicable to the prior art, the present invention, or some combination of the two. No assumption should be made regarding the applicability of this information except as referenced within the applicable preferred embodiment description of the present invention as given later in this document.

LIST OF ABBREVIATIONS

The following acronyms will be used throughout this document:
AID Native Identifier for TL1 objects
AMC Alcatel Management Console
AMV ALMAP View (GUI Framework)
API Application Programming Interface
AS/ASM Alarm Surveillance Manager
ANS Alcatel Network Systems
ASN.1 Abstract Syntax Notation 1
CGA Common Gateway Architecture
COBRA Common Object Request Broker Architecture
CMIP Common Management Information Protocol
CMISE Common Management Information Service Element
CRB Change Review Board
DDTS Fault Report System
DII Dynamic Invocation Interface
DME Distributed Management Environment
DN Distinguished Name (name in a NVP)
EML Element Management Layer
EMS Element Management System
FAD Functional Access Domain
FDN Fully Distinguished Name
GDMO Guidelines for the Definition of Managed Objects
GEM Generic Element Manager
GP Gateway/Proxy
GUI Graphical User Interface
GW Gateway
HPOV HP Open View
IDL Interface Description Language
IDL Interface Description Language
IM Information Model
IOR Interoperable Object Reference
IP Internet Protocol
LIT Local Integration Test
LOC Lines of Code
LTN Local Transport Networks
MIB Management Information Base
MSAN Multi Service Access Node
NE Network Element
NML Network Management Layer
NMS Network Management System
NVP Name-Value Pair
OAD Object Access Domain
OMG Object Management Group
OS Operations System (e.g. Network Management Application)
OVE Approved instructions for engineering activities
PNM Physical Network Manager
PY Person Years
Q3 An object-oriented network management protocol
RDN Relative Distinguished Name
RTC Real Time Clock
SDH Synchronous Digital Hierarchy SIT System Integration Test
SITC SIT completed
SMF System Management Framework
SNMP Simple Network Management Protocol
SONET Synchronous Optical Network
SQL Structured Query Language
SVT System Validation Test
SW Software
TLD Top Level Design
TL1 Transaction Language 1
UML Unified Modeling Language
X.25 A communications protocol These acronyms must be interpreted within their context as describing either the prior art (in some contexts) or the present invention and its embodiments. Some terms will apply to both the prior art and the present invention while others may apply to one or neither of these.

DEFINITIONS

The following definitions will be used throughout this document in describing the prior art as well as the present invention and its embodiments:

Fine-grained model—an object-oriented model in which there is an object instance for each entity in the problem domain. A fine-grained model typically defines an object class for each entity type in the problem domain and deals with lots of object instances (thousands to millions of objects). Reference FIG. 16 (1603) for a typical example of this model.

Coarse-grained model—a semi-object-oriented model in which there is only a very limited amount of object instances. A coarse-grained model typically only defines a limited number of object classes and deals with a very limited number of object instances (tens of objects). Reference FIG. 16 (1602) for a typical example of this model.

Facade object—an object that acts as a front (or shell) for dispatching requests to an actual modeled object. A facade object is the key towards the definition of coarse-grained modules.

Hierarchical model—an object oriented model in which parent-child relationships are defined. Reference FIG. 16 (1601) for a typical example of this model.

Fully Distinguished Name—a unique identifier for objects in hierarchical object modules. A FDN is a sequence of Relative Distinguished Names (RDNs). An RDN is a name-value pair (NVP) in which the name is commonly referred to as the Distinguished Name (DN). Each child of the same parent has a unique RDN. In other words, each RDN is unique within its parent's context.

Object View—the definition of the (sub)set of attributes and the (sub)set of operations visible on the object. Different views on the same object have a different set of attributes and/or a different set of operations available on the object.

BACKGROUND OF THE INVENTION

OVERVIEW

Network elements (NE) (0115, 0116, 0125, 0126) as illustrated in FIG. 1 generally make use of many different communication protocols. This diversity in communications protocols increases the difficulty and time to customize a common network element manager system (EMS) (0113, 0114, 0123, 0124) for every network element using a different protocol in the system. For example, incorporating the individual protocols within the EMS generally increases the overall subsystem complexity, increases code size, probability of software error/failure, and compilation time. Thus, as illustrated in FIG. 2, the current state of the art is to incorporate each network element protocol (TL1, SNMP, Q3, etc.) within each EMS (0210, 0220, 0230). These protocols (0211, 0221, 0231) are then used to communicate with the various protocol-specific network elements (0212, 0213, 0222, 0223, 0232, 0233).

EMS SOFTWARE DEVELOPMENT

Prior to the present invention, as illustrated in FIG. 2 the code of the network manager system (EMS) (0210, 0220, 0230) had to be revised and recompiled for each different protocol (0211, 0221, 0231) used by a network element (0212, 0213, 0222, 0223, 0232, 0233). Software developers maintaining EMS had to be very knowledgeable of the network element manager code and the structure of this system in order to make any necessary revisions to the software code. Thus, the level of software developer expertise in the prior art is significant and nontrivial, and the amount of time required to implement changes to the EMS is significant.

DESCRIPTION OF THE PRIOR ART

As illustrated in FIG. 2, a common software configuration implementing a network management function may include numerous Element Management System (EMS) components (0210, 0220, 0230) each of which implements a different protocol (TL1, SNMP, Q3, etc.) (0211, 0221, 0231). These protocols (0211, 0221, 0231) are integrated into each EMS component (0210, 0220, 0230) and constitute a combined Application Logic and Protocol Layer (0240).

The rationale for various EMS embodiments (0210, 0220, 0230) is that the protocols they implement (TL1, SNMP, Q3, etc.) (0211, 0221, 0231) are necessary to support a variety of network switching and multiplexing equipment (0212, 0213, 0222, 0223, 0232, 0233) that by necessity or implementation requires a specific communication protocol. This Network Element (NE) layer (0250) may incur significant changes as new equipment is added and/or removed and new protocols or protocol extensions are incorporated in the various network elements (0212, 0213, 0222, 0223, 0232, 0233).

As each of these network changes is incurred, the EMS software must be recompiled with each new protocol change to incorporate this new network management functionality into the overall system. This creates a significant burden on software management personnel, as the tight integration of the application logic and the network element protocol layer within the EMS makes this system difficult to maintain and prone to errors in software development and maintenance.

OBJECTS OF THE INVENTION

Accordingly, the objects of the present invention are (among others) to circumvent the deficiencies in the prior art and affect the following objectives:

(1) To reduce software maintenance overhead associated with Element Management Systems.

(2) To enable Element Management Systems to be augmented with additional Network Elements without the need for recompilation.

(3) To minimize the complexity of Element Management Systems so as to increase their reliability and ease of software maintenance.

(4) To reduce the time needed to implement changes to an EMS.

(5) To permit changes to be made to the EMS by software developers with a reduced skill set.

(6) To permit implementation of network elements from a variety of vendors into a single EMS.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

Overview

Referencing FIG. 3, the present invention can best be illustrated in terms of an exemplary network management application in which a wide variety of applications, such as Alarm Surveillance Manager (AS, a NML-layer application that allows one to monitor, acknowledge, and resynchronize alarms sent by a collection of NEs) (0301), Physical Network Managers (PNM, a NML-layer application that allows a network administrator to add/delete and supervise/unsupervised NEs) (0302), and the like along with their possible interface adapters (0313). In this scenario one or more Generic Element Manager Systems (GEM/EMS) (0311, 0312) communicates with a Generic Element Manager Application Server subsystem (0321) via a standard software interface such as CORBA (0320). The GEM Application Server (0321) then communicates over an internal API (0330). This API is then interfaced to one or more generic protocol proxies (0331, 0332) that then communicate with the network elements (0351, 0352) via a network element protocol specific interface (0341, 0342).

The architecture of the system illustrated in FIG. 3 differs significantly as compared to the prior art in that the GEM/EMS Application Server (0321) along with the associated internal API interface (0330) and generic proxies (0331, 0332) represent a new paradigm in the implement of network element management to control, supervise, and monitor the various network elements (0351, 0352) via a wide variety of network element specific protocols (0341, 0342).

GENERIC ELEMENT MANAGER SYSTEM (GEM/EMS)

Briefly, the invention is a system permitting a network Element Management System (EMS) to be maintained and modified without the huge software overhead of supporting a plethora of network protocols that are targeted towards a variety of network elements (NE).

As illustrated in FIG. 4, the present invention solves the problem present in the prior art by using a common gateway architecture (CGA) (0401) driven by an EMS (0400) designed to be generic across different types of network elements and different network element protocols. The architecture is best described as client/server based with a gateway/proxy (GP) layer (0450) that contains the protocol specific generic gateways. The GP layer (0450) is not required to have any specific network element knowledge but instead just needs to know the protocol used to communicate with the network elements (0412, 0413, 0422, 0423, 0432, 0433). The GP layer (0450) formats requests from the server layer (0440) into protocol specific requests and translates the protocol-specific responses into server objects/attributes. The GP layer (0450) is the only component directly interfacing with the network elements (0412, 0413, 0422, 0423, 0432, 0433) to setup or close connections, send commands and receive responses and monitor for events/alarms.

BRIEF DESCRIPTION OF THE DRAWINGS

For a fuller understanding of the advantages provided by the invention, reference should be made to the following detailed description together with the accompanying drawings wherein:

FIG. 8 illustrates an exemplary CGA interface specification (1/2);

FIG. 9 illustrates an exemplary CGA interface specification (2/2);

FIG. 10 illustrates an exemplary RESPONSE data structure;

FIG. 11 illustrates an exemplary base object class definition;

DESCRIPTION OF THE PRESENTLY PREFERRED EXEMPLARY EMBODIMENTS

Figure 1:
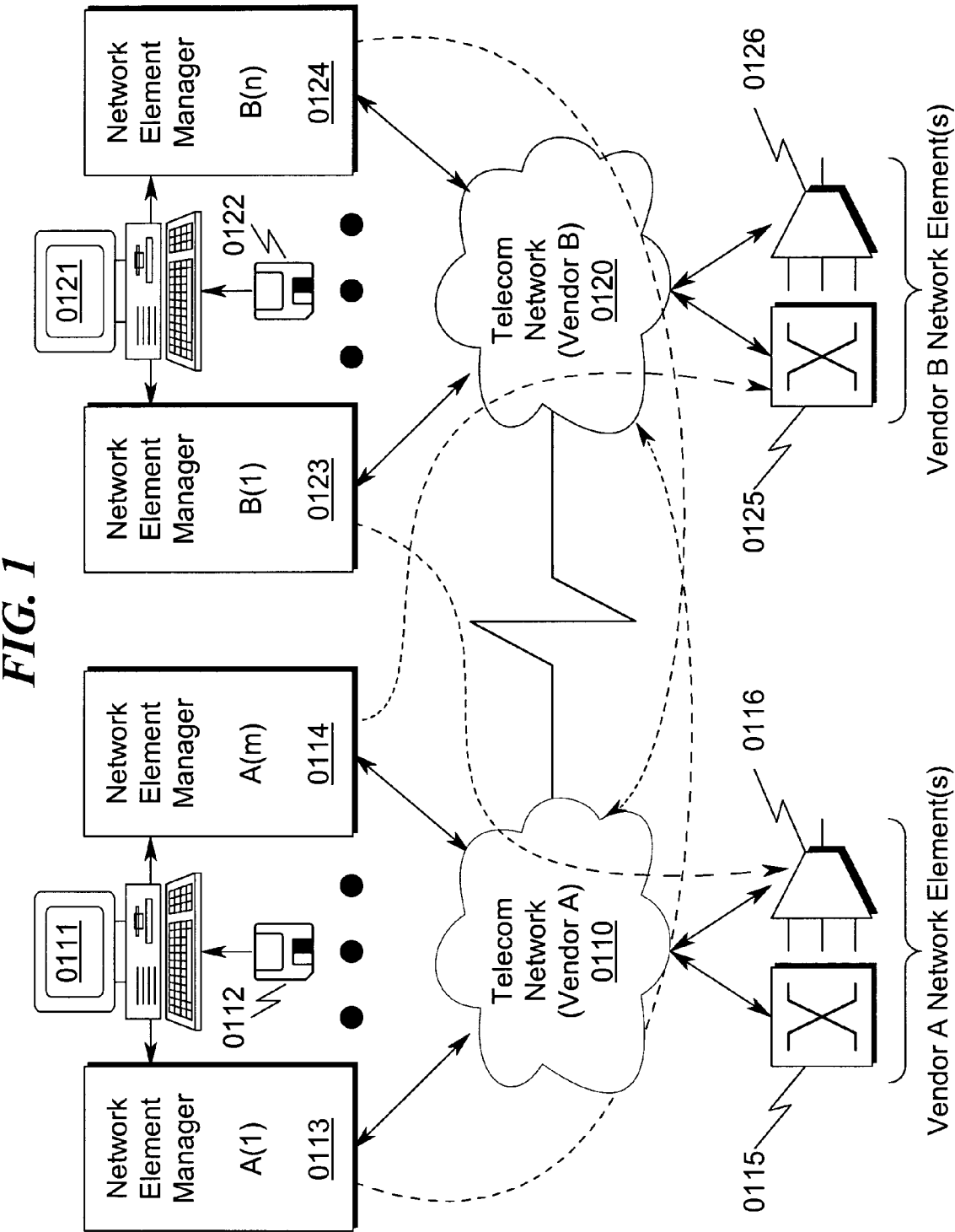
FIG. 1 illustrates an exemplary architectural overview of how the present invention interfaces into an integrated multi-vendor network management system incorporating computer monitoring, configuration, and the like via software control.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of an ELEMENT MANAGER COMMON GATEWAY ARCHITECTURE SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

DEFINITIONS

Throughout the discussion in this document the following definitions will be utilized:

System Blocks/Procedural Steps Not Limitive

The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.

Personal Computer Not Limitive

Throughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications.

Internet/Intranet Not Limitive

Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

The present invention specifically anticipates that in some implementations the GUI development framework (and/or its runtime component) will communicate with the data used to drive the GUI over the Internet. Thus, the application driving the user interface may reside on one computer system and the data used for presentation and control may be contained somewhere else on another computer system and be accessed via any number of networking protocols.

Application Programming Interface (API) Not Limitive

While the present invention may be in part implemented using standard Application Programming Interfaces (APIs) such as Software Development Kits (SDKs) and the like, there is no requirement that the present invention be implemented using these tools.

Operating System Not Limitive

Additionally, while the present invention may be implemented to advantage using a variety of Microsoft® operating systems (including a variety of Windows™ variants), nothing should be construed to limit the scope of the invention to these particular software components. In particular, the system and method as taught herein may be widely implemented in a variety of systems, some of which may incorporate a graphical user interface. Some examples of these include HP-UX™, LINUX™, SOLARIS, and UNIX™ (and its variants), among others.

Data Structures Not Limitive

The present invention may be embodied in a variety of data structures in some preferred embodiments. However, the form of such data structures as described herein is only exemplary. One skilled in the art would quickly realize that a wide variety of other data structures could be used equivalently in this application. Therefore, no data structure contained herein should be interpreted as limiting the scope of the present invention.

OVERVIEW

Figure 4:
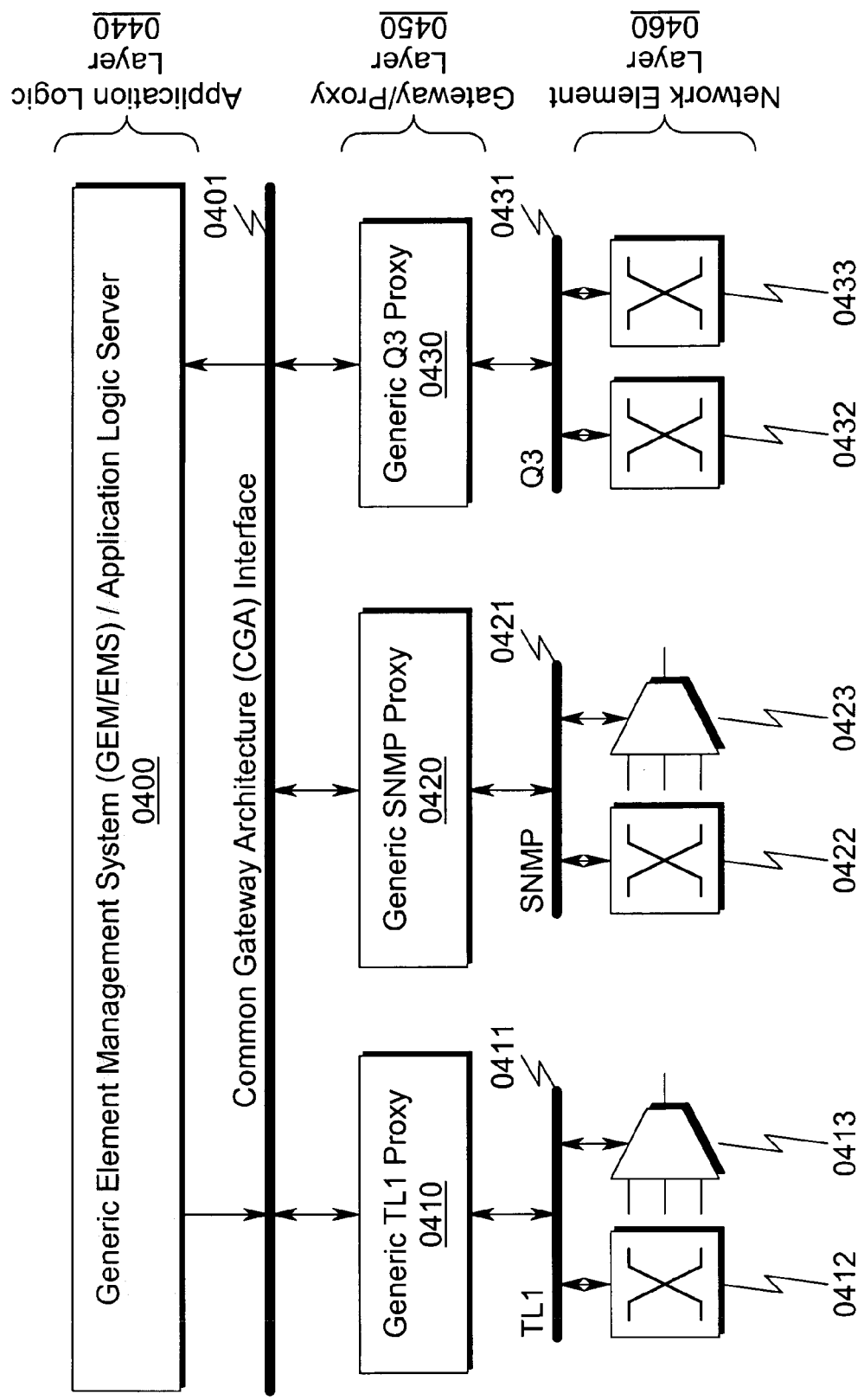
FIG. 4 illustrates a presently preferred embodiment of the invention illustrating how the Element Management System (EMS) is augmented with a Common Gateway Architecture interface (CGA) to provide a generic gateway/proxy (GP) interface.

As illustrated in FIG. 4, the present invention utilizes a Generic Element Management System (GEM/EMS) (0400) that interfaces with a Common Gateway Architecture (CGA) (0401) that communicates with a variety of generic proxies (0410, 0420, 0430, etc.). These proxies (0410, 0420, 0430) then communicate in a protocol-specific manner (0411, 0421, 0431) with a variety of network elements (0412, 0413, 0422, 0423, 0432, 0433) that may be from a variety of equipment vendors. The strength of this architecture lies in the ability to communicate with equipment of a variety of vendors without having to specifically code (and maintain) this support in the EMS (0400).

Referencing FIG. 4, the Common Gateway Architecture (CGA) (0401) is a client/server architecture in which the Element Management System (EMS) (0400) takes the role of "client" and the protocol gateways/proxies (0410, 0420, 0430) take the role of "server". The EMS (0400) defines all protocol-independent application logic while the gateways/ proxies (0410, 0420, 0430) deal exclusively with protocol-specific knowledge.

Generally, the present invention uses one protocol gateway/proxy per Network Element protocol (0411, 0421, 0431). The CGA (0401) defines a generic protocol-independent interface between client (EMS) (0400) and server (gateway/proxy) (0410, 0420, 0430), the CGA Interface (0401). In other words, each protocol gateway/proxy (0410, 0420, 0430) needs to implement this generic interface.

From FIG. 4, it is clear that the present invention can be thought of as incorporating an Application Layer (0440), a Gateway/Proxy Layer (0450), and a Network Element Layer (0460). Since the Application Layer (0440) in the present invention is represented as a Server, with corresponding Client functionality being incorporated in the Gateway/ Proxy Layer (0450), the following discussion will detail these elements and how they interact.

EMS Application Server Architecture (0500)

Figure 5:
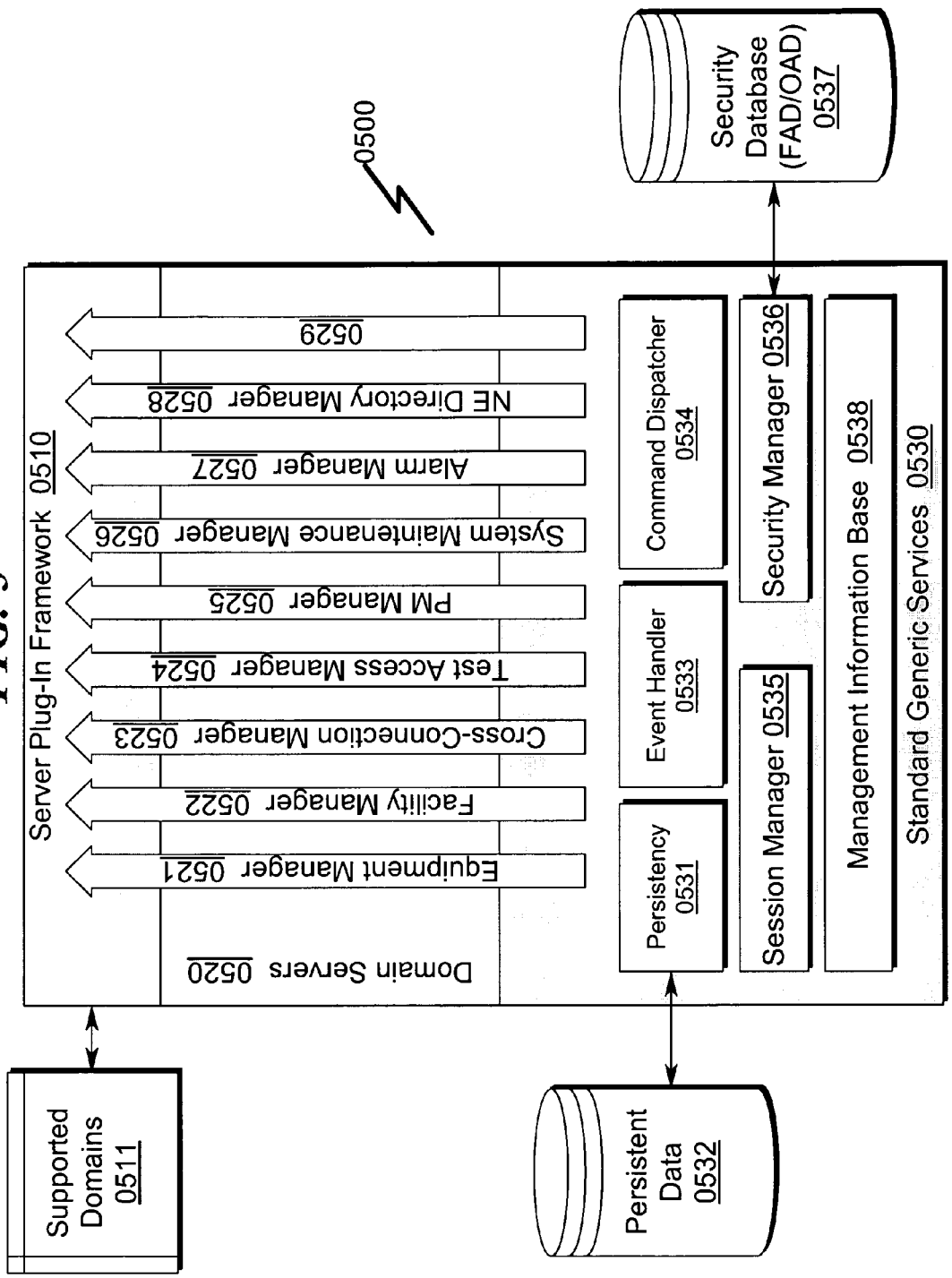
FIG. 5 illustrates an exemplary system block diagram of the server architecture used within the present invention.

FIG. 5 illustrates an exemplary embodiment of the EMS Application Server Architecture (0500). The architecture (0500) can be split up into three logical parts: the Server Plug-in Framework (0510), the Domain Servers (0520) and a collection of Standard Generic Services (0530) available to all domain servers.

Server Plug-in Framework (0510)

The Server Plug-in Framework (0510) allows for subcomponents (i.e. functional domain managers) to be plugged into the system.

The components that are available in the system are read from a Supported Domains configuration file (SupportedDomains.properties) (0511). As different types of Network Elements possibly support different subsets of Network Management functions, the Supported Domains configuration file is indexed by NE type and release and is consulted each time a new NE instance is added to the system.

When a request to perform a certain NM function comes in, the responsible domain server is looked up and when no such server is available for the given NE instance, an OperationNotSupportedexception is thrown by the system.

Domain Managers (Plug-ins) (0520)

Domain Managers (plug-ins) (0520) provide specific NM functionality for their domain. Each domain manager has its own name space and possibly shares (or provides access to) parts of his name space with other domain managers. Domain managers are also referred to as domain servers or domain servants.

Illustrated in FIG. 5 are exemplary domain servers (0520) including Equipment (0521), Facility (0522), Cross-Connection (0523), Test Access (0524), PM (0525), System Maintenance (0526), Alarm (0527), and NE Directory (0528) Managers. One skilled in the art will recognize that a wide variety of other plug-ins (0529) are also possible and supported by this architecture.

Standard Generic Services (0530)

Standard Generic Services (0530) generally includes a collection of services available to all domain managers.

The Persistency Service (0531) provides a repository for persistent data, like the list of NEs to be managed by the server with all the necessary address information to contact each NE.

The Event Handler (0533) listens for autonomous messages coming from the different NEs, and dispatches those messages internally towards the relevant domain manager (alarm manager, database change handler.

The Command Dispatcher (0534) interacts with the protocol specific gateway/proxy for sending commands to and receiving responses from the target Network Element.

The Session Manager (0535) maintains information (operator profile) about each client connected to the server. It builds Session CORBA objects for each client. Clients then use their dedicated Session object to obtain a reference to their dedicated domain managers.

The Security Manager (0536) limits the actions available to a particular client on an individual object or group of objects. The security manager interfaces with the security database (0537). This database contains Object Access Domains (OAD) and Functional Access Domains (FAD) associated with operator profiles.

The Management Information Base (MIB) (0538) is a collection of objects used in the request routing process, i.e. the process of forwarding incoming requests to the right domain manager for domain specific processing. The MIB acts as a cache for subsequent requests to those domain managers that keep (parts of) their name space in memory (e.g., the equipment domain manager). The MIB provides convenient object retrieval/storage functionality.

Gateway/Proxy Layer Overview (0600)

Figure 6:
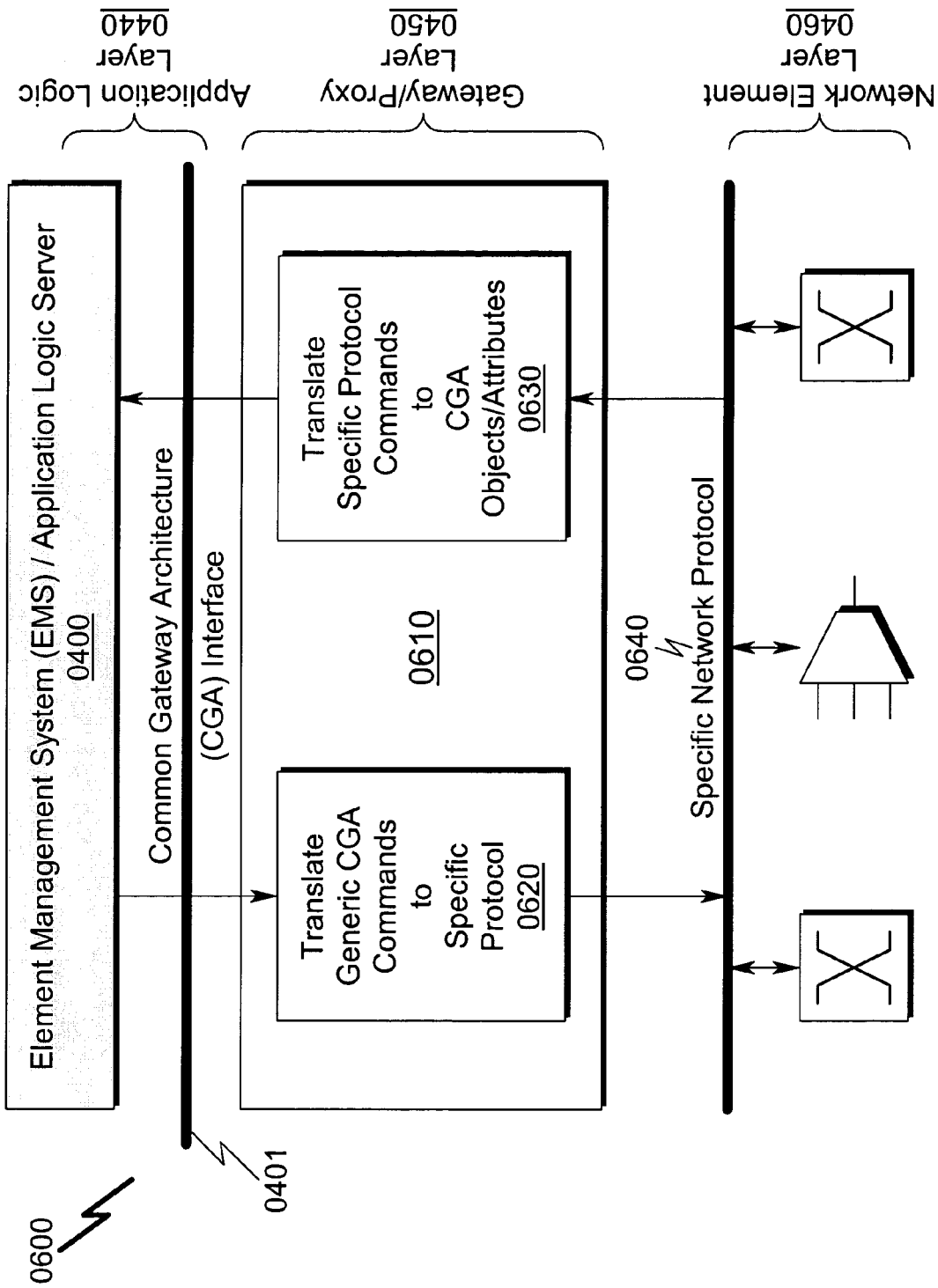
FIG. 6 illustrates an exemplary system block overview diagram of the gateway/proxy (GP) interface module and its general functionality.
Figure 7:
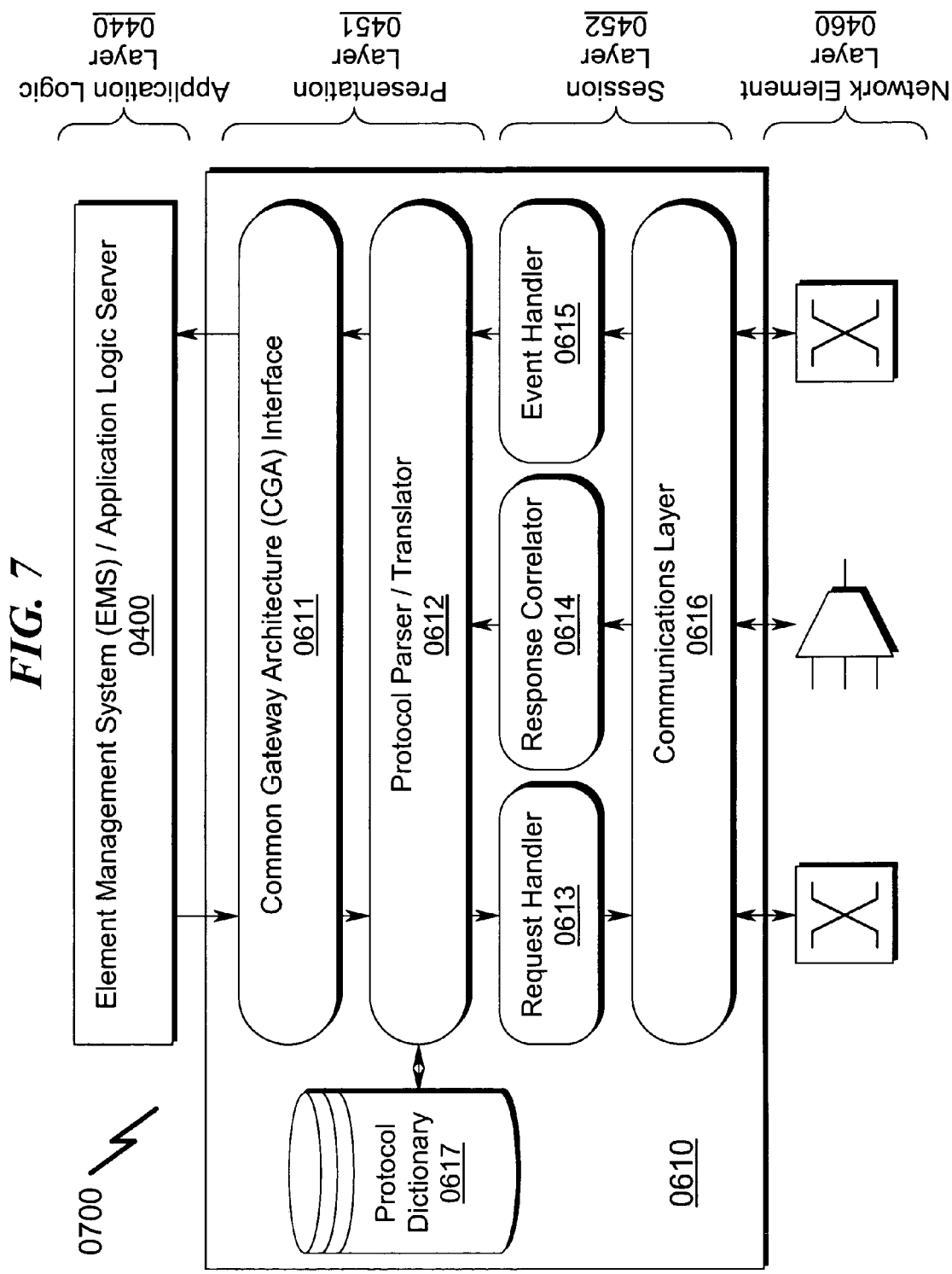
FIG. 7 illustrates an exemplary system block diagram of the gateway/proxy (GP) interface module and its associated session and presentation layers.

Referencing the Gateway/Proxy Layer High Level Overview in FIG. 6, the gateway/proxy layer (0450) consists of proxies (0610) that format requests (0620) from the EMS (0400) application logic layer (0440) into protocol-specific requests (0640) and translates the protocol-specific responses (0630) into application logic layer (0440) objects/ attributes for use by the EMS. The gateway/proxy layer (0450) is the only component directly interacting with the network elements (at the network element layer (0460)) to setup or close connections, to send commands and receive responses and to monitor for autonomous messages (alarms and events).

Figure 2:
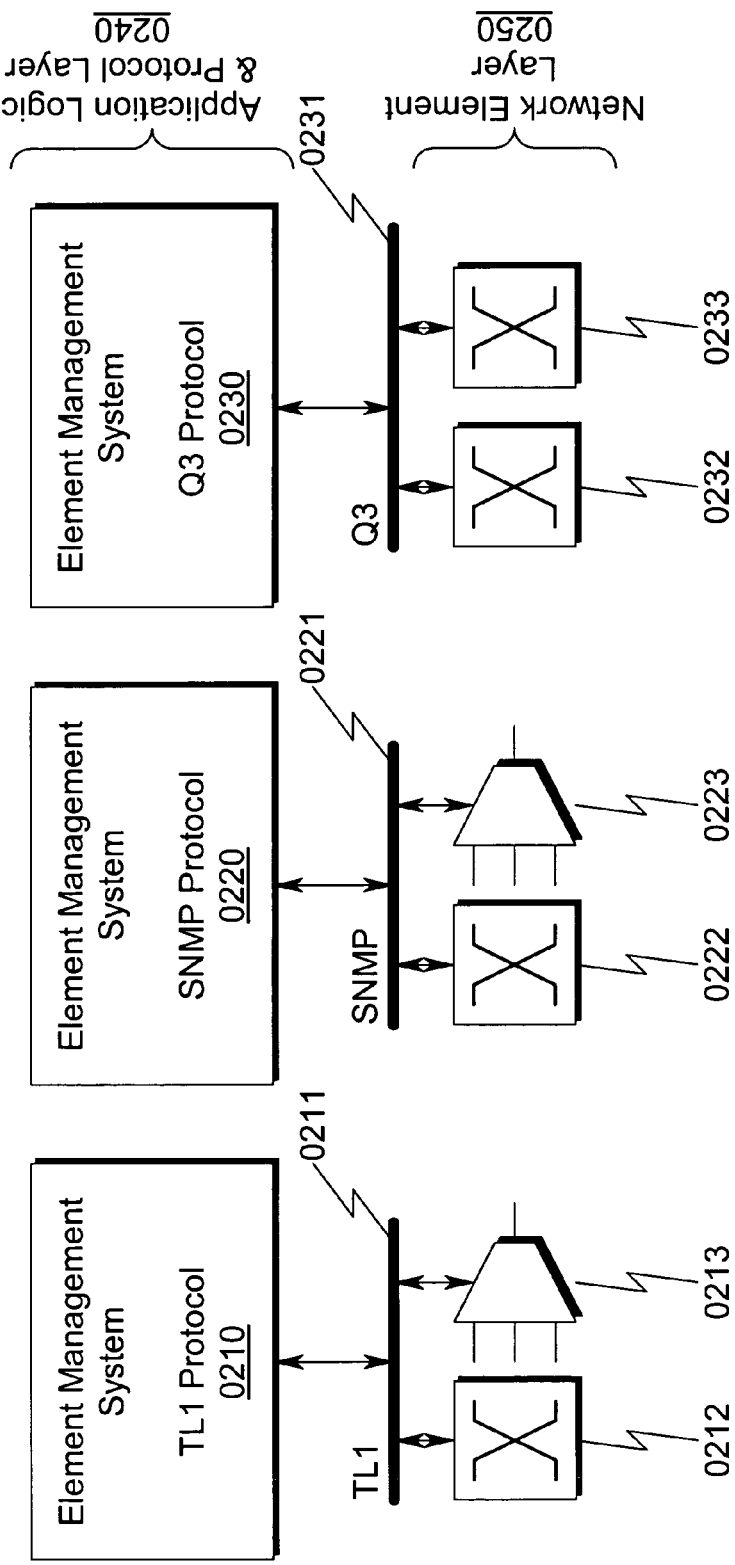
FIG. 2 illustrates an architectural overview of the prior art and illustrates the connectivity between traditional an Element Management System (EMS) and their associated Network Elements (NE)
Figure 3:
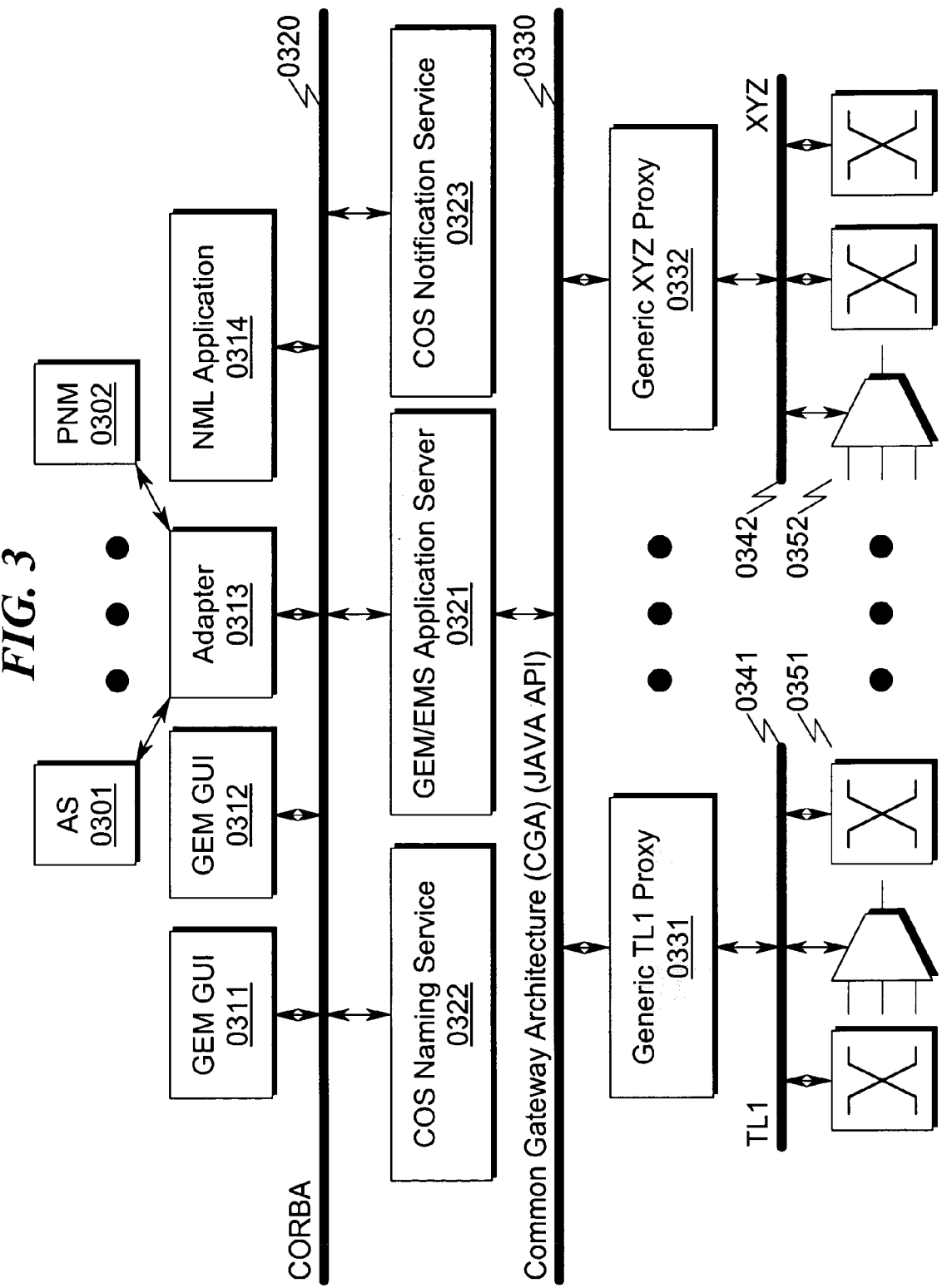
FIG. 3 illustrates an exemplary architectural software overview of the present invention and illustrates the connectivity between the disclosed Generic Element Management System (GEM/EMS) and the associated Network Elements (NE) via generic proxies.

The architecture depicted in FIGS. 3, 4, and 6 contrasts with the PRIOR ART architecture illustrated in FIG. 2 in that in the PRIOR ART architecture the application logic is network element protocol dependent. This means that all application logic needs to be revised (or event completely rewritten) when a new protocol is added to the network.

The Common Gateway Architecture (CGA) illustrated in FIG. 6 allows the application logic (0400, 0440) to be shared among protocols, using a protocol independent data model, also called a Management Information Base (MIB). It is the responsibility of the protocol gateways/proxies (0410, 0420, 0430, 0610) to translate the data structures the MIB is built up with, into protocol-specific data structures (0640) and vice versa.

Gateway/Proxy Architecture Components (0700)

FIG. 6 illustrates an exemplary high-level architecture (0700) common to all protocol gateways/proxies (0610) and illustrates an exemplary set of components comprising same. Each gateway/proxy (0610) is protocol specific, but network element implementation independent. The gateway/proxy requirements are:

Manage the connections to the network elements, including automatically re-establishing connections when they get lost (0616).
Match network element responses with EMS requests, including correlation of linked replies (0614).
Parse (0612) and report autonomous messages (0615).
Be network element independent (0612).
Support multiple network element connections at the same time (0616).
Be multi-threaded to handle multiple commands at the same time.
Implement the CGA interface (0611).

The protocol parser/translator (0612) merely defines the syntax of the commands, the responses and the autonomous messages. Each network element however defines the semantics of the commands, their input arguments and their result (output). These differences between network elements are handled in NE type and release dependent configuration files, stored in the protocol dictionary (0617).

For each network element type/release, the protocol dictionary (0617) stores all command templates and the rules to parse individual object attributes out of command responses and autonomous messages. Command templates are the actual commands in the right syntax with placeholders for the command-input arguments. The rules to parse individual object attributes out of command responses and autonomous messages are regular expressions in case of the TL1 protocol. In case of the Q3 protocol, the dictionary implements the Q3 GDMO model and the attributes are immediately available as attributes on the managed objects defined in the GDMO model, with ASN.1 syntax. One skilled in the art will quickly realize that a wide variety of protocols exist and that for each of these supported by the CGA, there must exist corresponding translation tables within the protocol dictionary (0617).

CGA Interface Description

The generic interface between EMS and protocol gateways/proxies can be defined in the programming language of choice, or even in IDL, depending on the overall system requirements. An exemplary embodiment of this interface may be defined in Java as illustrated in FIGS. 8–9.

The definition of Address and all exceptions is left unspecified. A NameAndStringValue structure is the representation of a name-value pair in which both the name and the value are of type String. An AttributeValue structure is the representation of a name-value pair in which the name is of type String and the value is of type org.omg.CORBA.Any. An object of type org.omg.CORBA.Any can represent any type defined in IDL. The reason for using CORBA structures at this level is to avoid structure translation from EMS MIB to clients.

The Response object is the protocol independent object used for passing information from gateway/proxy to the EMS. An example Response data structure could be as simple as the exemplary listing illustrated in FIG. 10.

The above data structure resembles the definition of an SQL database table. The fields are Any structures and can therefore contain any pre-defined IDL data structure. The unique identification of each object in the response is included as one of the columns in this table. In case of the TL1 protocol, this unique identifier will be an AID; in case of the Q3 protocol, the unique identifier is an FDN. The EMS MIB has a mapping function to translate these unique identifiers into internal unique object identifiers. Typically, this mapping function is NE dependent.

The commandId argument in the sendCommand( ) function is the unique identification for the action to be executed in the network element. The protocol gateway/proxy searches for this commandId in the protocol dictionary for the given network element type and release and finds the command template associated with this identifier.

Ideally, command identifiers are logical identifiers corresponding to high-level actions available in all network elements, no matter what their protocol is. Examples of such logical identifiers are: get, set, delete, create, login and logout. However, in order to provide 100% manageability, most of the command identifiers will be network element specific.

The entityId argument in the sendCommand( ) function is the unique identification of the target object in the network element for the action. In order to support hierarchical network element models, the entityId takes the form of a Fully Distinguished Name (FDN) structure. An FDN is a sequence of Relative Distinguished Names (RDNs). An RDN is a name-value pair in which the name is commonly referred to as the Distinguishing Name (DN). Each child of the same parent has a unique RDN, in other words: each RDN is unique within its parent's context.

The inArgs argument in the sendCommand( ) function corresponds to the list of arguments of the command. The protocol gateway/proxy replaces each placeholder in the command template, with the value of the corresponding argument in the argument list.

The outArgs argument in the sendCommand( ) function corresponds to the list of attributes to be returned by the command. Only the given attributes will appear in the Response structure.

Protocol Independent Data Model

The Element Management System's internal object model needs to be protocol independent. More specifically, this requirement means the model needs to be able to store any number of attributes of any possible type. One way this can be achieved is by storing attribute-value pair lists, in which the value is of type org.omg.CORBA.Any, in a generic object class from which all other MIB object classes inherit. Specialization can be applied to better organize object functionality, hence facilitating the implementation of the application logic.

An example base object class definition is illustrated in FIG. 11. All member functions have intentionally been left out.

Common Domain Server Architecture (1200)

Figure 12:
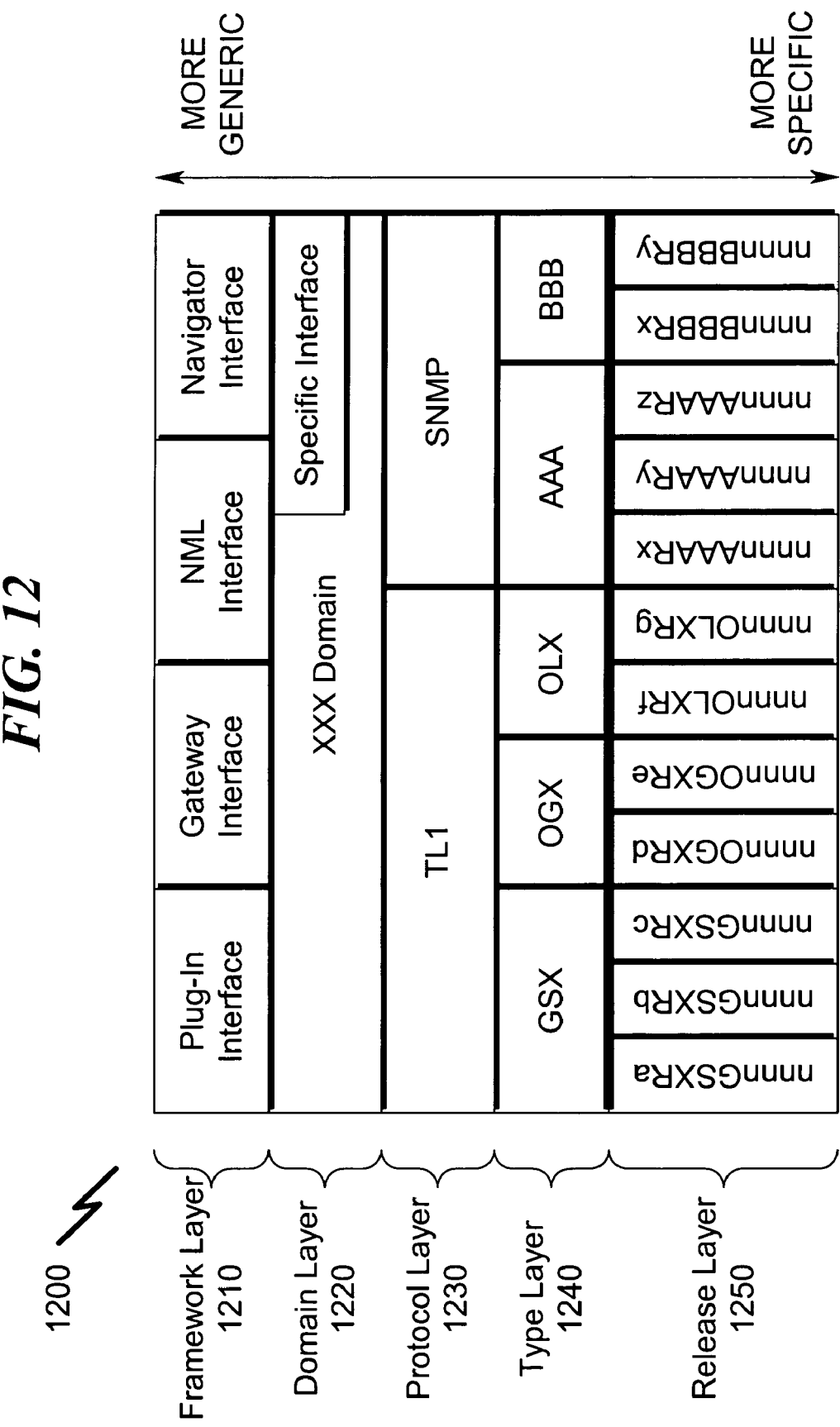
FIG. 12 illustrates an exemplary architecture for the common domain server utilized in the present invention, and shows that the layered organization allows one to reuse the implementation or overload the implementation of the upper layers, therefore reducing the overall domain server code size while remaining flexible enough to support a variety of network element types/releases/protocols.

This section describes a design pattern (as illustrated in FIG. 12) that may be used to broadly exemplify embodiments of the present invention (as opposed to providing an exemplary actual implementation). Each domain server uses this design pattern (1200) as a guideline for implementation, the details of which are described separately in this document.

FIG. 12 illustrates a typical domain server. Each domain server supports the Plug-In interface. This interface includes functions to:

Add/remove NEs from the system

Starting/stopping the supervision of an NE

Generally each domain server publishes the following open CORBA interfaces:

Specific EML Interface—this is a strongly typed interface for functionality that is domain specific, but NE type and release independent. Support of a specific EML interface is optional. A pointer to the CORBA object instance implementing this interface is obtained from the Session CORBA object instance. Generic EML Interface (Navigator) (used to obtain 100% manageability)—this is a weakly typed interface that provides a way to access a fine grained object model through a coarse grained IDL interface. It basically consists of a browser (Navigator) for traversing a hierarchical object model and for discovering each objects attributes and supported functionality. A pointer to the CORBA object instance implementing this interface is obtained from the CORBA object instance implementing the specific EML interface.

Generic NML Interface (ECOM)—this is the interface used by higher level NML applications. The interface is NE type and release independent. The implementation of the interface is done in terms of the implementation of the EML interfaces.

In order to avoid substantial rework when a new NE type is introduced to the system, the domain server's implementation uses a layered approach. As much of the NE specifics as possible are isolated in NE specific configuration files, but there are always situations where this static way of handling specifics is simply not possible or not practical. In those situations, object specialization (inheritance) is applied and an object factory is used to instantiate the right version of the object's implementation, given its NE type and release.

The following layers can be distinguished within the domain server (1200):

Framework Layer (1210)—this includes the interface a domain servant needs to support in order to be manageable by the server framework. The plug-in interface defines the functions addNE, deleteNE, startSupervision and stopSupervision. The implementation depends on the domain servant. The Navigator Interface is the generic interface through which the domain servant's name space can be discovered, including the functionality supported by each individual object in that name space.

Domain Layer (1220)—this layer is domain specific, but protocol/NE type and NE release independent. It includes the implementation of the optional domain specific interface. This layer can work with native identifiers, but cannot interpret the value of the native identifier as this is protocol specific.

Protocol Layer (1230)—this layer is only domain and protocol specific. It doesn't include any NE specifics, but can deal with protocol specific concepts, like AIDs in case of the TL1 protocol.

Type Layer (1240)—this layer implements all NE specifics for the given domain. It doesn't deal with any differences between NE type releases.

Release Layer (1250)—this is the most specific layer. It only implements the differences between releases of a certain NE type. Most of these differences can normally be handled statically through configuration files so this layer should be fairly slim.

Protocol independent communication with the NE is handled through the generic gateway interface to be supported by all gateways.

Client Architecture (1300)

Concept

In the present invention, clients are lightweight: they handle nothing but presentation data and should therefore per definition be NE/protocol independent. They are of course function dependent, which could in fact be seen as NE dependence if a particular function is only available in one particular NE. This is however not part of the definition of NE independence as used throughout this document. Only handling presentation data means that no interpretation may be done of any attribute values returned by the server other than translate those values into user friendly, language dependent strings.

NE dependence however occurs when 100% manageability needs to be provided over a strongly typed IDL interface. A strongly typed interface is an interface where all functionality is available as specific functions with a specific set of typed arguments (hard-coded function signature). A weakly typed IDL interface provides a generic execute( ) function that takes an action ID and a name-value-pair sequence as arguments. In case of a weakly typed interface, 100% manageability can still be achieved without becoming NE dependent in two ways:

the server allows a client to discover the supported functionality of the objects it manages.

the client reads the supported functionality (including the function's required parameters and their data types) from configuration files.

The navigation interface allows the client to build up its name space (navigation tree) without any knowledge about the NEs in its view. It also allows the client to discover the functionality provided by those NEs. Using the navigation interface, building up the name space becomes as easy as browsing a file structure.

GEM uses both types of interfaces: each domain server (optionally) publishes its own strongly typed interface and all domain servers share the navigation interface which is weakly typed.

Architecture

Figure 13:
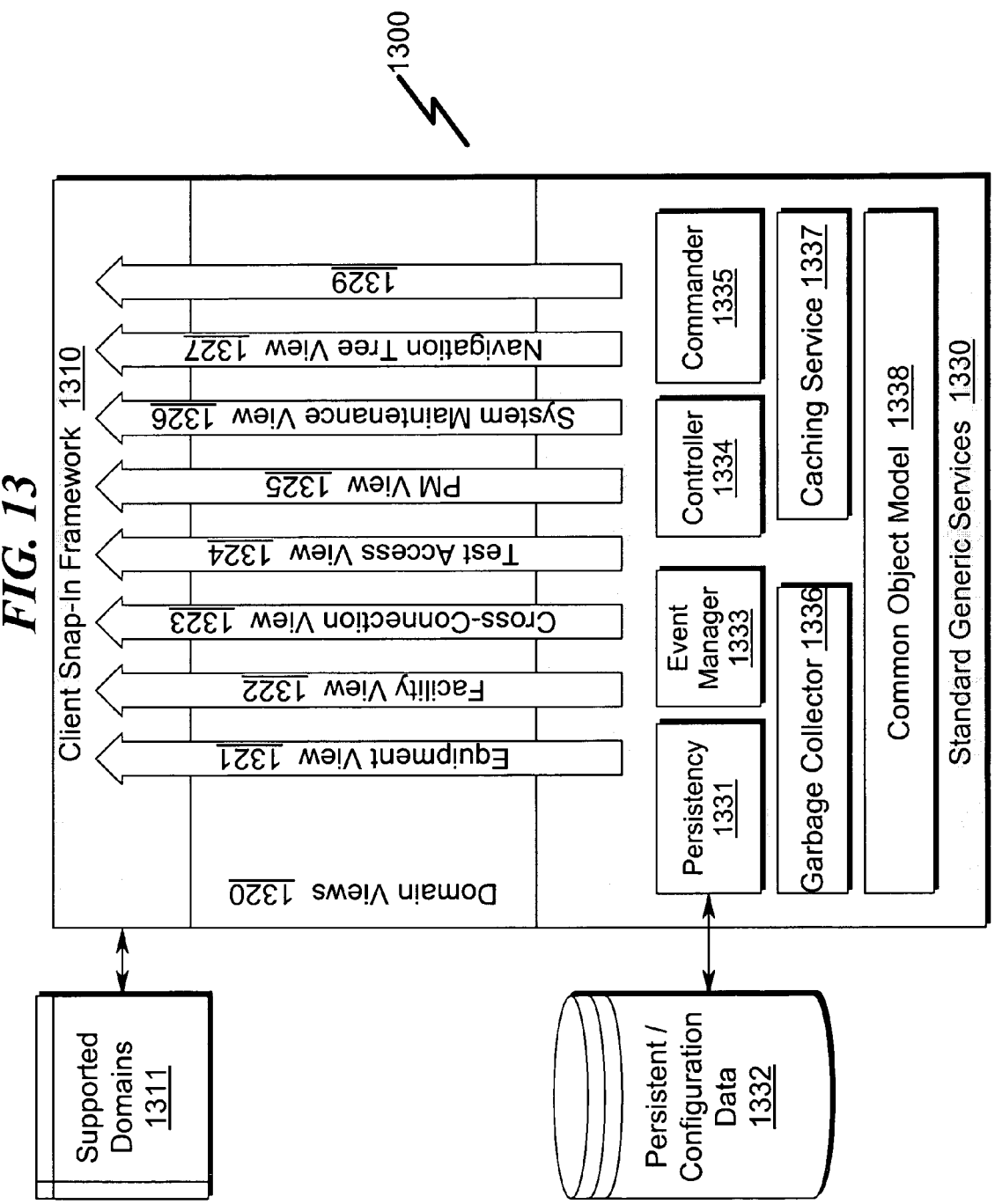
FIG. 13 illustrates an exemplary embodiment of the client architecture utilized in the present invention.

The Client Architecture (1300) as illustrated in FIG. 13 looks very similar to the EMS Application Server Architecture (0500) illustrated in FIG. 5. At the client side, the plug-in concept is also applied but here the plug-in components are commonly referred to as "snap-in" components.

The Client Snap-In Framework (1310) allows for subcomponents (views) (1320) to be plugged into the system. This component takes care of initializing the browser (Navigation Tree View) through the dynamic loading of the snap-ins listed in a configuration file (1311). Each snap-in initializes its root node, which corresponds to the root node of the corresponding server-side plug-in. This is sufficient for the framework to be able to discover the rest of the name space including the functionality supported by each entity in the name space.

Domain Views (Snap-Ins) (1320) provide specific NM functionality for their domain. Each Domain View (1321, 1322, 1323, 1324, 1325, 1326, 1327, 1329) has its own name space that is nothing more than a restricted view on the overall Object Model. Multiple different views can share objects. Each Domain View has a corresponding server-side Domain Manager (0520).

Standard Generic Services (1330) are a collection of services available to all domain views (1320).

The Persistency Service (1331) provides a repository for persistent data like common configuration files and storage of user preferences (1332).

The Event Manager (1333) listens for autonomous messages coming from the event service and updates the model accordingly. The Model uses the event manager's services to register for object creation, object deletion and attribute value change notifications.

The Controller (1334) makes sure all views on the model are kept up to date by applying the model-view-controller design pattern. It supports multiple views on the same data. Each modeled object maintains a reference count so that information can be garbage collected in the model as soon as nobody is still visualizing that data.

The Commander (1335) provides the views with the interface towards the server. It makes the IDL layer invisible to view implementers. This object provides an API which is basically a 1-to-1 mapping from the functionality defined on the IDL interface with the difference that for each available function a synchronous and an asynchronous version is available. The Commander object intercepts the responses to each request in order to keep the MIB up-to-date without client-side development effort and to act as a cache for subsequent requests. The Commander object only needs to be extended for the optional specific interface supported by some domain servant.

The Garbage Collector (1336) is a configurable component that removes objects from the MIB, based on their reference count. The garbage collector can be configured to run automatically at certain intervals, manually or when the number of garbage collectable objects reaches some predefined (configurable) value.

The Caching Service (1337) is a configurable component that artificially keeps the reference count above 0 for objects that are not currently being displayed, but are good candidates for becoming visible again in the near future. The caching service has a configurable View stack size. Whenever a view becomes invisible (replaced by some other view), it is pushed onto the View stack. When a view drops off the stack, all of its objects are being invalidated (reference count set to 0) so that they become food for the garbage collector.

The Common Object Model (1338) is a transient collection of objects organized in a tree structure. The collection of all objects in this Model is the overall name space. The model is built up without any programming effort required from the view implementers. The model acts as a cache for subsequent requests for the same information. A view implementer doesn't know when a request for information was satisfied locally or remotely. The model also doesn't require any user intervention for keeping its information up-to-date. Event registration is done dynamically based on what is currently being stored in the model and therefore what is currently being displayed somewhere. The actual objects stored in the model are fully customizable through user-supplied object factories.

Exemplary System Deployment (1400)

Figure 14:
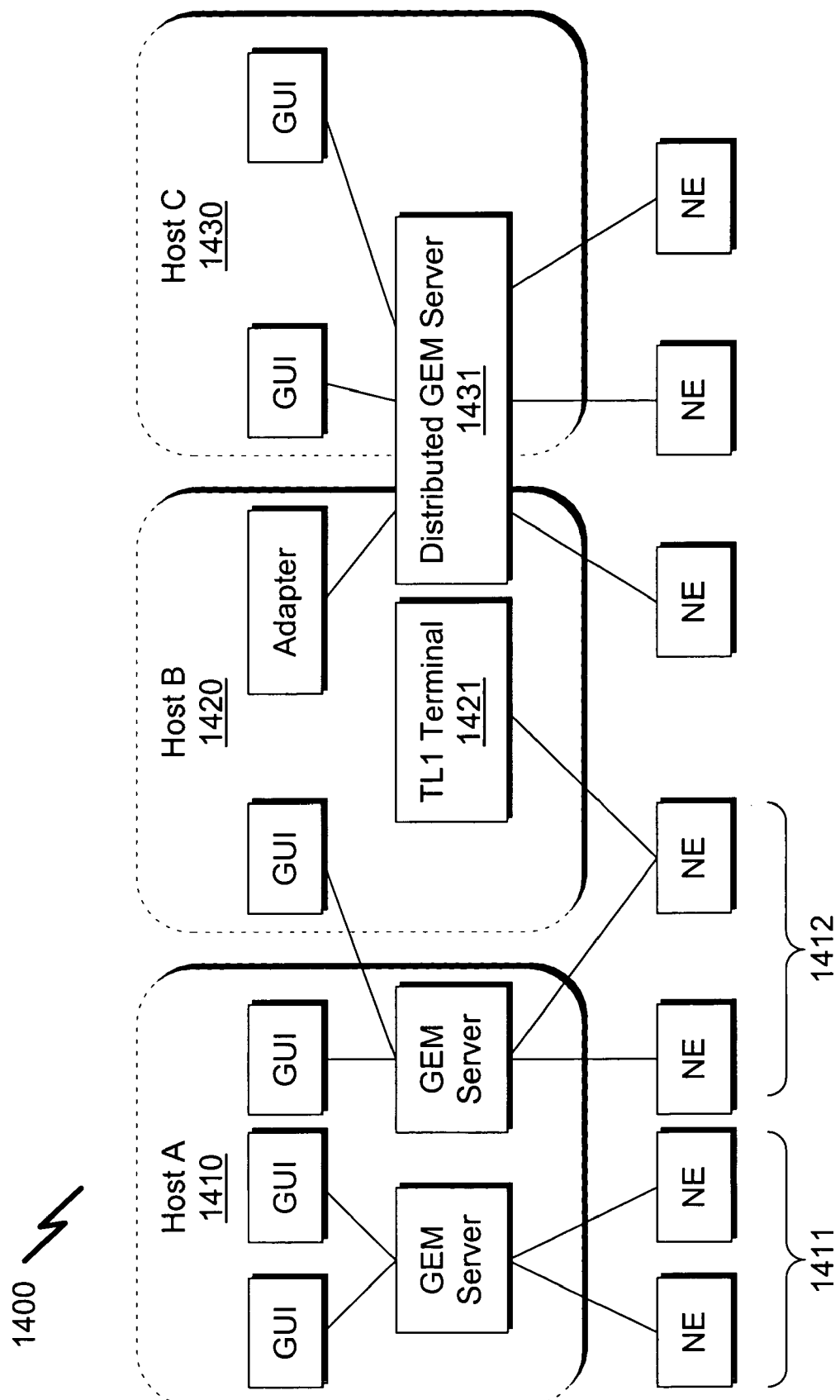
FIG. 14 illustrates an exemplary deployment of the present invention and shows a variety of control and management relationships between the various network elements.

While there are many possible deployment scenarios utilizing the present invention, several are preferred. An exemplary embodiment of one such deployment (1400) is illustrated in FIG. 14. This example may in many circumstances represent the "normal" deployment situation. This means that the setups described here are not the only "working" ones, but that they are the "desired" ones in terms of expected performance and added value in many practical systems implementing the present invention.

The optimal implementation of the present invention permits one GEM server per host to have an unlimited number of clients. These clients are either GEM GUI instances, protocol adapters towards external applications or higher level NML applications. Each client typically talks to just one server. The interface between client and server is CORBA based and a client knows how to contact the server by means of the Naming Service. The IOR of the Naming Service is set in a client-side (and server-side) configuration file (ORB.properties). The Naming Service can be running on the same machine or on a remote machine in the same network.

Multiple instances of GEM servers can co-exist on the same machine (1410, 1430) and each server typically manages multiple NEs (1411). Each NE should however be managed by at most one GEM server (1412), while at the same time, another type of manager is allowed to operate on the same NE (e.g., TL1 terminal) (1421). One GEM server consists of multiple domain servers (plug-in components) which are all registered with the Naming Service and therefore can be distributed across multiple machines (1431) in the same network.

Naming Service Registration/Naming Policy (1500)

The following section explains how the Naming Service is being used in the context of the present invention.

Figure 15:
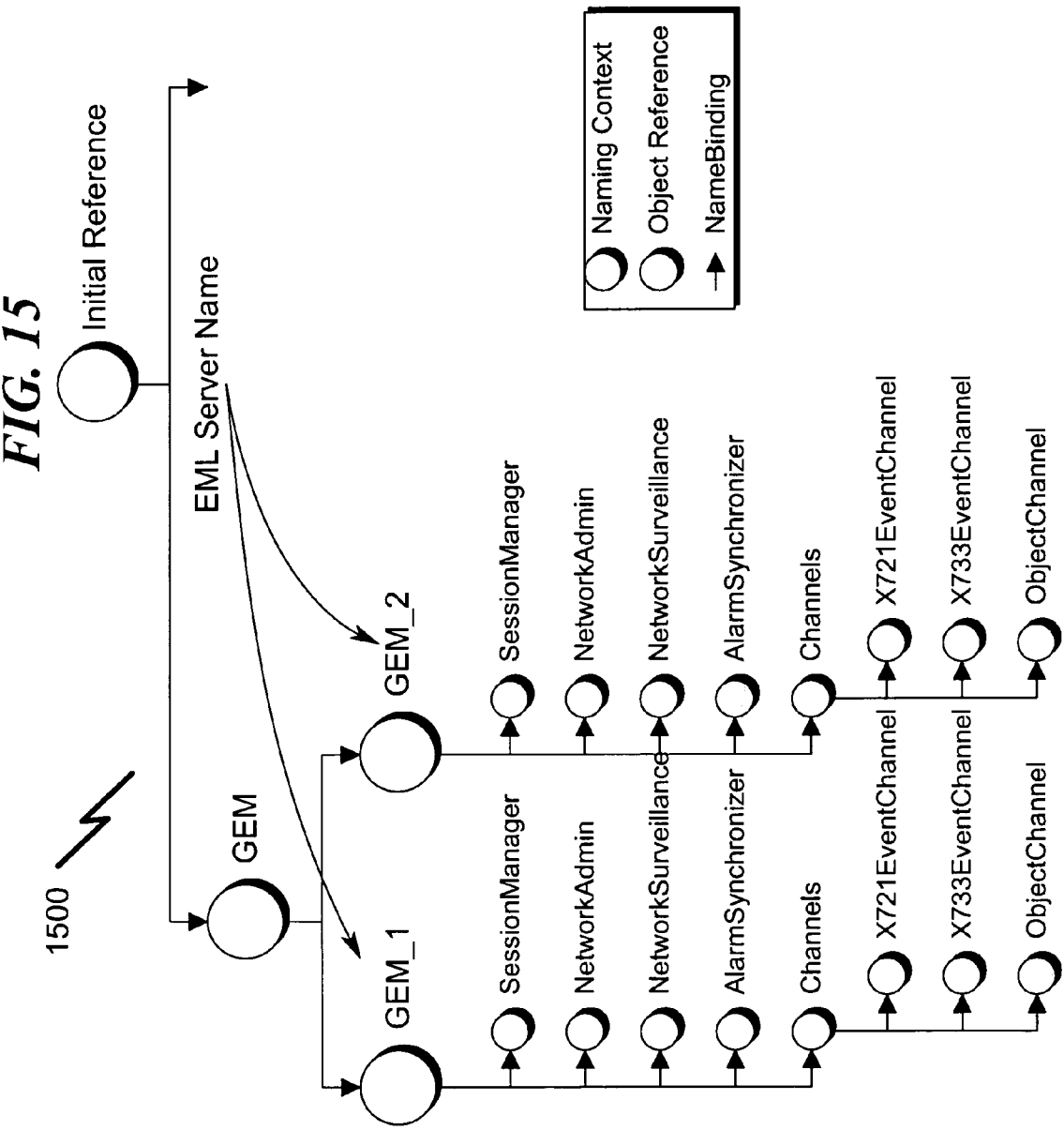
FIG. 15 illustrates an exemplary naming service registration and naming policy associated with the present invention.
Figure 16:
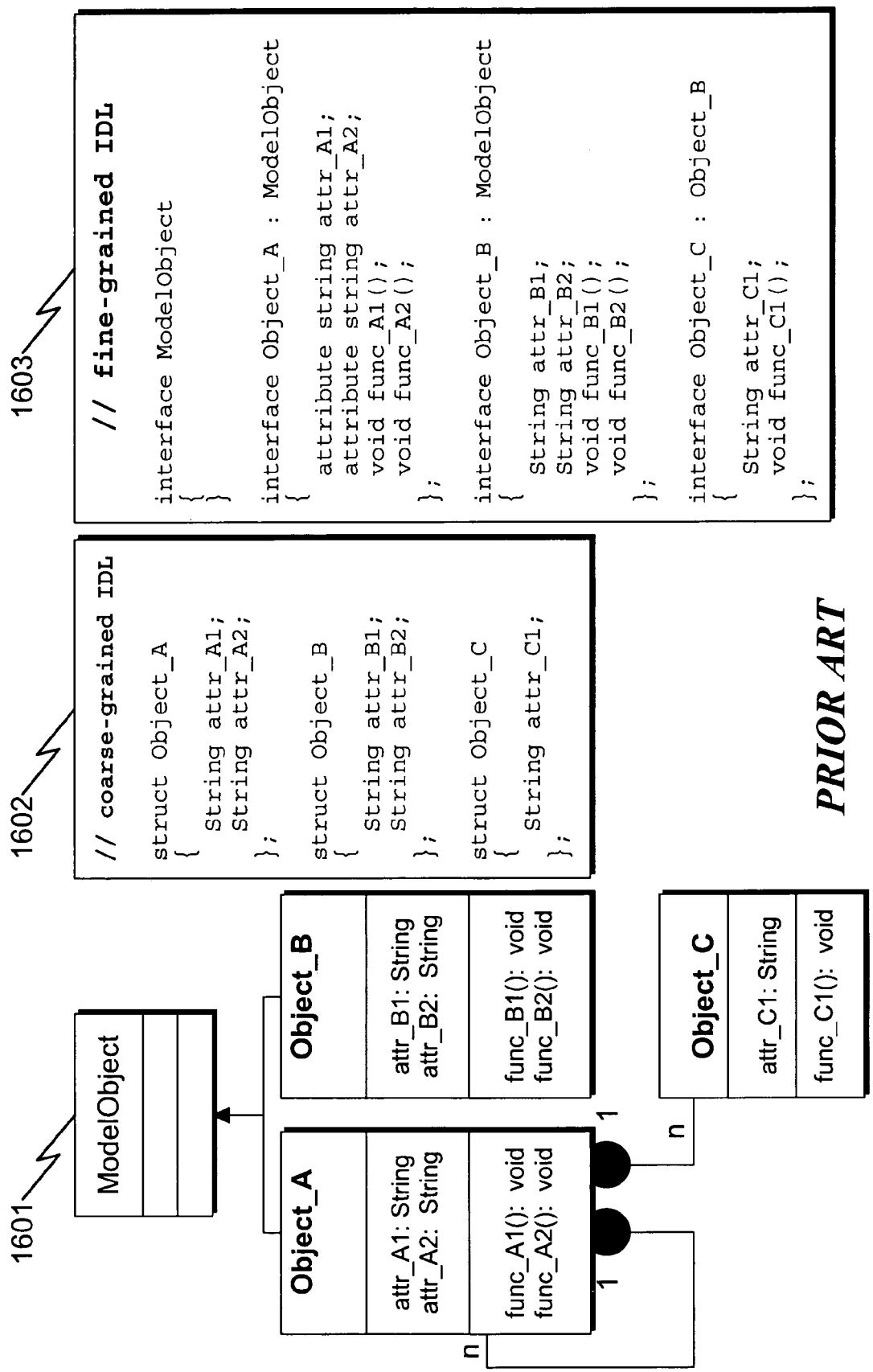
FIG. 16 illustrates prior art differences between coarse grained and fine grained models that may be used in some implementations of the present invention.

FIG. 15 illustrates an exemplary embodiment of the Naming Policy (1500). The figure shows an example in which two (2) GEM Application Servers (EMLs) exist. Their names ("GEM_1" and "GEM_2") correspond to the NeGroupId as used by PNM (0302) that uniquely identifies a group of NEs with a certain EMS. The "SessionManager" object reference is the entry point for obtaining references (IORs) to domain managers.

The object references associated with "NetworkAdmin", "NetworkSurveillance" and "AlarmSynchronizer" are required by the ALMAP components AS and PNM. Their exact names are typically defined in an IDL definition file.

AS also requires the name of the channel on which alarms are being sent, to be "X733EventChannel". PNM requires the name of the channel on which state changes are being sent, to be "X721EventChannel". Similarly, these two identifiers are typically defined in an IDL definition file.

NE Management

NE Management is the process of adding NEs to the network, removing NEs from the network and making the NEs available or unavailable for management operations. All of these operations are initiated from the Physical Network Management (PNM) (0302) application user interface.

NE States
There are a number of states an NE can be in:
Communications state—a read-only state attribute that informs the manager that the NE is reachable over the network or not. In the first release of GEM this state is mapped onto the operational state.
Operational state—a read-only state attribute that informs the manager that the resource is operational or disabled. A disabled resource is unavailable for management operations.
Administrative state—a read/write state attribute that informs the manager that the resource is locked, unlocked or shutting down. Locking a device makes it unavailable for management operations.
Supervision state—a read/write state attribute that informs the manager that the server is logged into the network element (supervised) or not (declared). There are also 2 transitional states: supervising (in the process of logging in) and unsupervising (in the process of logging out). Practically, a supervised NE reports alarms to the manager, while a declared NE doesn't.
MIB alignment state—a read-only state attribute that informs the manager that the data he is managing might be stale (misaligned). The data is up-to-date when the state is aligned.

Any changes to these states are reported as state change notifications. PNM is one application that registers for these state change events. Any attempt by a manager to perform operations on a resource that is unavailable will by answered with an InvalidState exception.

Add NE
As mentioned previously, at system startup the list of managed NEs is read from persistent storage. Once the system is running, NEs can be added via the PNM user interface. The information entered is:
NE name (logical name)
NE type As PNM doesn't provide a way to specify the NE's protocol, this information needs to be read from a server side configuration file that provides the mapping from NE type to NE protocol.

PNM generates an internal identification for the NE. This identification cannot be modified, as opposed to the logical NE name. Clients work with the logical NE name, while the server works with the internal identification.

The following steps are performed:
The NE's name (logical and internal) and type is added to the persistent storage.
The NE's type is used to lookup the NE's protocol and supported domains.
The object factory is instructed to build an Ne<Domain>object for each domain supported by a network element of the given type.
These Ne<Domain>objects are added to the Ne object's plug-in map (key=domain identifier, value=object pointer).
The NE specific mapping dictionary is loaded. The name of the dictionary is <vendor>/<neType>/<neRelease>/<protocol>.properties. This dictionary contains the mapping information for all domains so it is stored in the NE object rather than in the domain specific NE<Domain>objects. (Note: the Dictionary object keeps a static reference count so that it needs to be built only once for all NEs of the same type; deleting an NE object then only decrements this reference count instead of removing the dictionary object).

No connection is being established with the NE during this step.

Remove NE
NEs are removed from the system via the PNM-USM interface. The following steps are performed:
The Ne object is deleted and by consequence all domain specific Ne<Domain> objects are deleted as well.
The NE's information is removed from persistent storage.

Note: as JAVA is the programming language of choice in the GEM project, the finalize( ) method needs to be implemented by all NE objects in order to perform the necessary cleanup, i.e. reverse the steps done in the addNE step.

Start Supervision
This is the process of making the given NE available for management. This operation is started through the PNM-USM interface. The following steps are performed:
The connection to the NE is established.
The server is logged into the NE.
All domain servers are notified of this event by calling their startSupervision( ) function.

See elsewhere in this document for the details of establishing a connection with the NE.

Stop Supervision
This is the process of making the given NE unavailable for management. This operation is started through the PNM-USM interface. The following steps are performed:
The server is logged out of the NE.
The connection with the NE is broken down, but the NE's information is not destroyed.
All domain servers are notified of this event by calling their stopSupervision( ) function.

NE Connection Management

NE Connection Management includes the process of establishing connections with the NE and tearing down those connections. It also includes the detection of broken connections and automatically reconnecting. Login and logout are also categorized under this header.

Connect to NE
From GEM's point of view, the connection to an NE is a TCP/IP connection (socket). The actual connection protocol used by the NE itself can be different, e.g. X.25, ACSE, RS232), the complexities of which are hidden by the communications server. The following steps are performed during the connection process:
The supervision state is set to ACTIVATING.
The address, user name and password are read from the persistent storage (obtained from PNM during the setAddress( ) action) and a socket connection is created with their values.
A new thread is started for monitoring incoming autonomous messages or command replies.
When all the previous was successful, the operational state of the NE is set to ENABLED.
The logout procedure is started. This is done to cope with the situation where the previous session was not logged out; i.e. the session is still active. The server cannot re-attach to a previous session.
The login procedure is started.
If the login procedure was successful, the startAlignment( ) method is called on all domain roots. When all domain roots successfully finished aligning, the MIB alignment state is set to ALIGNED and the supervision state is set to SUPERVISED. If logging in failed, the operational state is set to DISABLED, the MIB alignment state is set to MISALIGNED, the supervision state is set to DECLARED and the re-alignment thread is started.

Disconnect from NE

The following steps are performed:
The supervision state is set to DEACTIVATING.
The logout procedure is started.
The socket is destroyed.
The operational state is set to DISABLED and the MIB alignment state is set to MISALIGNED.
The supervision state is set to DECLARED.

Login to NE

Once the physical connection is established with an NE, the user still needs to login before operations can be done on it. All domain servers use the same connection and user account. The following steps are performed:

The TL1 command for logging in is built by using the NE specific TL1 dictionary.
The command is sent to the NE.
If the command failed, a ProxyError exception is thrown and the operational state is set to DISABLED.

Logout

Before closing a physical connection, the user needs to be logged out from the system first. Disconnecting without logging out first will work but is not clean. The following steps are performed:

The TL1 command for logging out is built by using the NE specific TL1 dictionary.
The command is sent to the NE.
If the command failed, a ProxyErrorexception is thrown.

Connection Lost/Reconnect

As with every distributed client/server architecture, the connection between client and server can break down or temporarily become unavailable. This situation is detected by means of 2 threads:

the communications polling thread—this thread detects the loss of communication between the GEM Application Server (role of client) and the Network Element (role of server).
the re-alignment thread—this thread continuously checks the communications state and MIB alignment state of this NE Loss of communication is detected by sending a ping request on regular time intervals. In the TL1 world, ping takes the form of RTRV-HDR. When the ping request is left unanswered within a set timeout, the MIB Alignment State is set to MISALIGNED and when a IO exception is received the communications state is set to DISABLED. When the communications state becomes DISABLED, the communications polling thread is stopped.

The re-alignment thread starts the re-connect process when the communications state is not ENABLED and starts the alignment process when the MIB alignment state is MISALIGNED. The general procedure for this re-connection is as follows:

1. try to reconnect to the same address;
2. if failing again, try different address . . .

Exemplary CGA Interface Components (1700)

Figure 17:
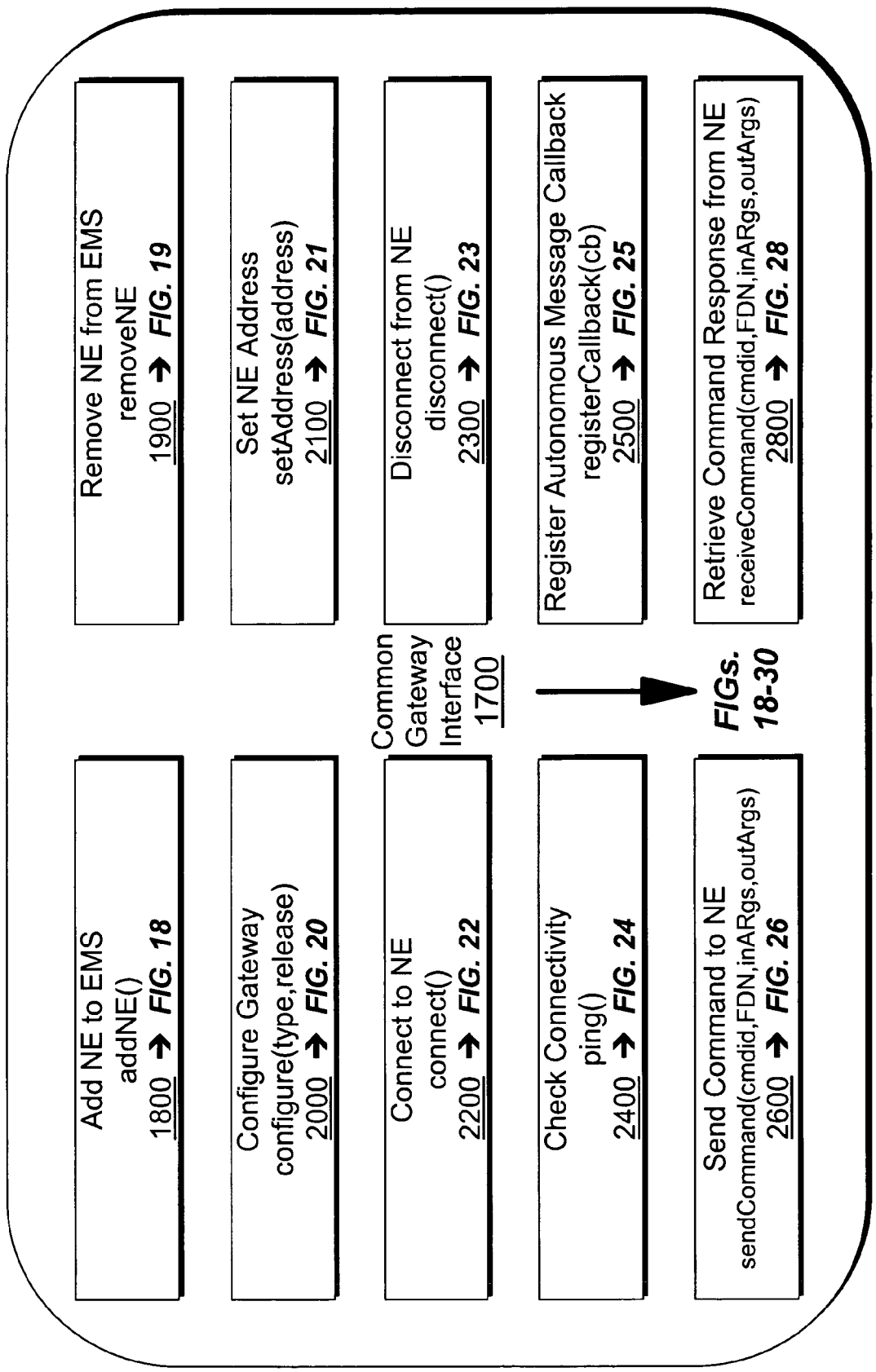
FIG. 17 illustrates an exemplary system block diagram of an exemplary complement of functions comprising one embodiment of the present invention.

While one skilled in the art will quickly recognize that there are a plethora of methods available to implement embodiments of the present invention, it is instructive to view one exemplary embodiment of the CGA architecture and a sample of some of the interfaces that it might permit. To this end, FIG. 17 illustrates an exemplary complement of CGA interface modules (1700) that are described in detail in the following sections.

Add NE to EMS (1800)

Figure 18:
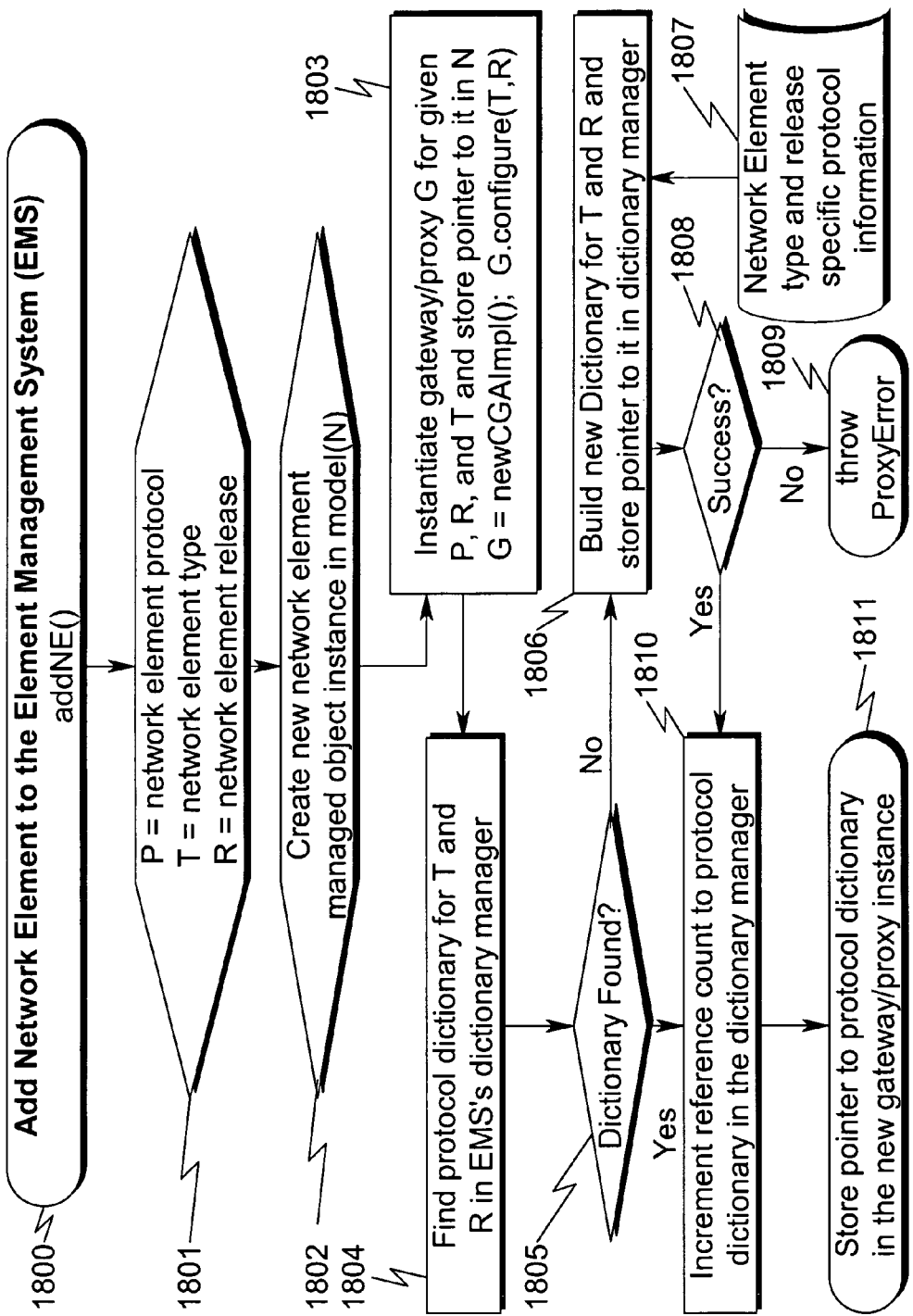
FIG. 18 illustrates an exemplary system flowchart illustrating an Add Network Element function.

A generalized flowchart for adding a network element to the element management system is illustrated in FIG. 18 (1800). The method generally follows the following steps as detailed in FIG. 18:

1. References to the network element protocol (P), network element type (T), and network element release (R) are defined (1801).
2. Create a new network element managed object instance in model (N) (1802).
3. Instantiate the gateway/proxy G for a given P, R, and T and store a pointer to it in N (1803).
4. Find the protocol dictionary for T and R in the element management system's dictionary manager (1804).
5. If the dictionary is found (1805), proceed to step 10.
6. Build a new dictionary for T and R and store a pointer to it in the dictionary manager (1806).
7. Retrieve network element type and release specific protocol information (1807).
8. if step 6 is successful (1808), then proceed to step 10.
9. Throw a ProxyError exception (1809) and exit.
10. Increment reference count to the protocol dictionary in the dictionary manager (1810).
11. Store a pointer to the protocol dictionary in the new gateway/proxy instance (1811).

One skilled in the art will recognize that these steps may be changed in order or function with no loss of generality.

Remove NE from EMS (1900)

Figure 19:
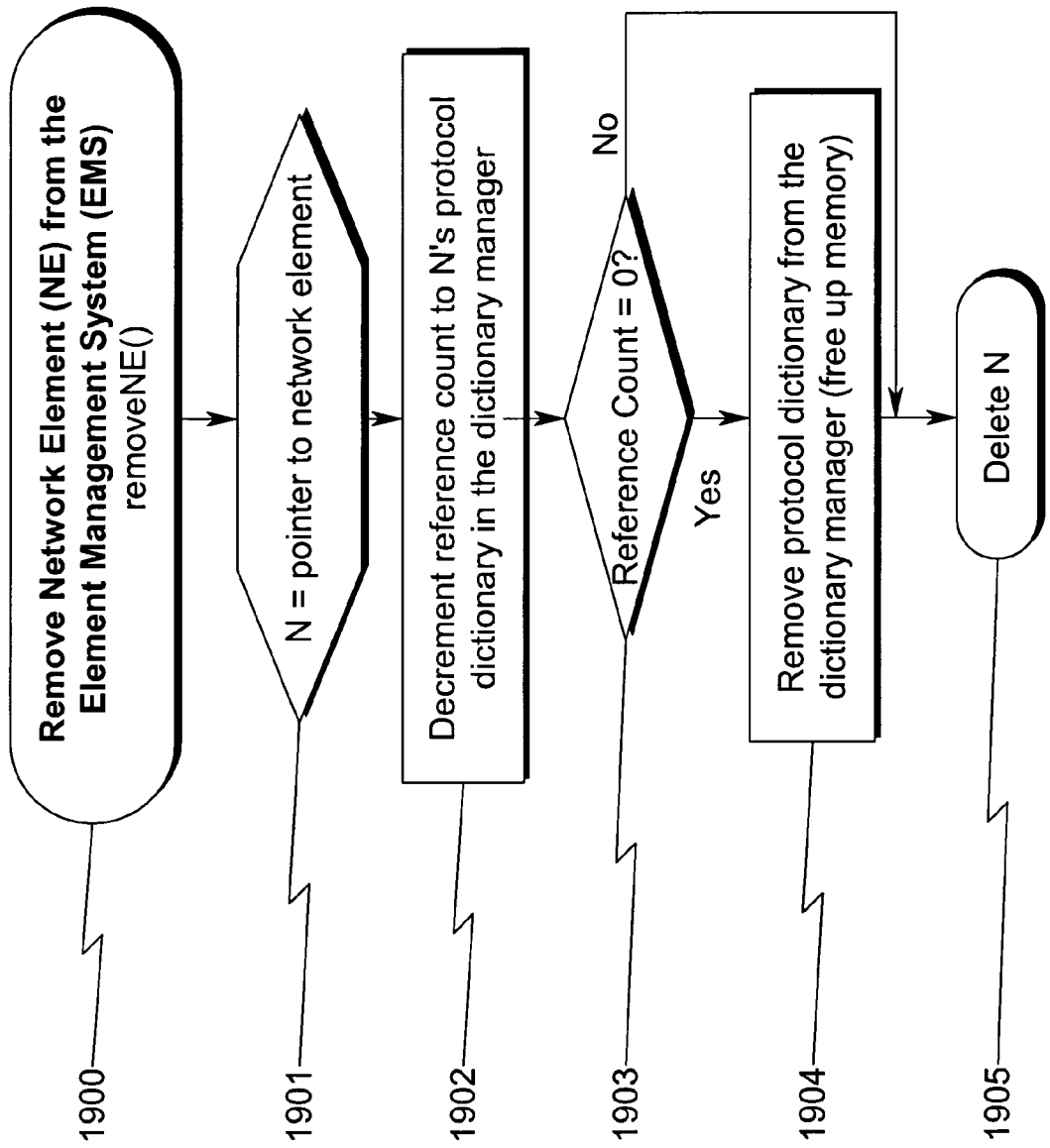
FIG. 19 illustrates an exemplary system flowchart illustrating a Remove Network Element function.

A generalized flowchart for removing a network element from the element management system is illustrated in FIG. 19 (1900). The method generally follows the following steps as detailed in FIG. 19:

1. Reference to the network element (N) is defined (1901).
2. Decrement the reference count to N's protocol dictionary in the dictionary manager (1902).
3. If the reference count is not zero (1903), then proceed to step 5.
4. Remove the protocol dictionary from the dictionary manager and free up memory (1904).
5. Delete the network element reference N (1905).

One skilled in the art will recognize that these steps may be changed in order or function with no loss of generality.

Configure Gateway (2000)

The protocol gateway doesn't have any NE specific knowledge built in. The gateway however needs to be configured for each network element type. This method instructs the gateway to process the protocol dictionary for the given network element type and release. Internally, the gateway will build up a map of command identifier to protocol template strings and a map of command identifier to rules to parse attribute values out of the command response.

Figure 20:
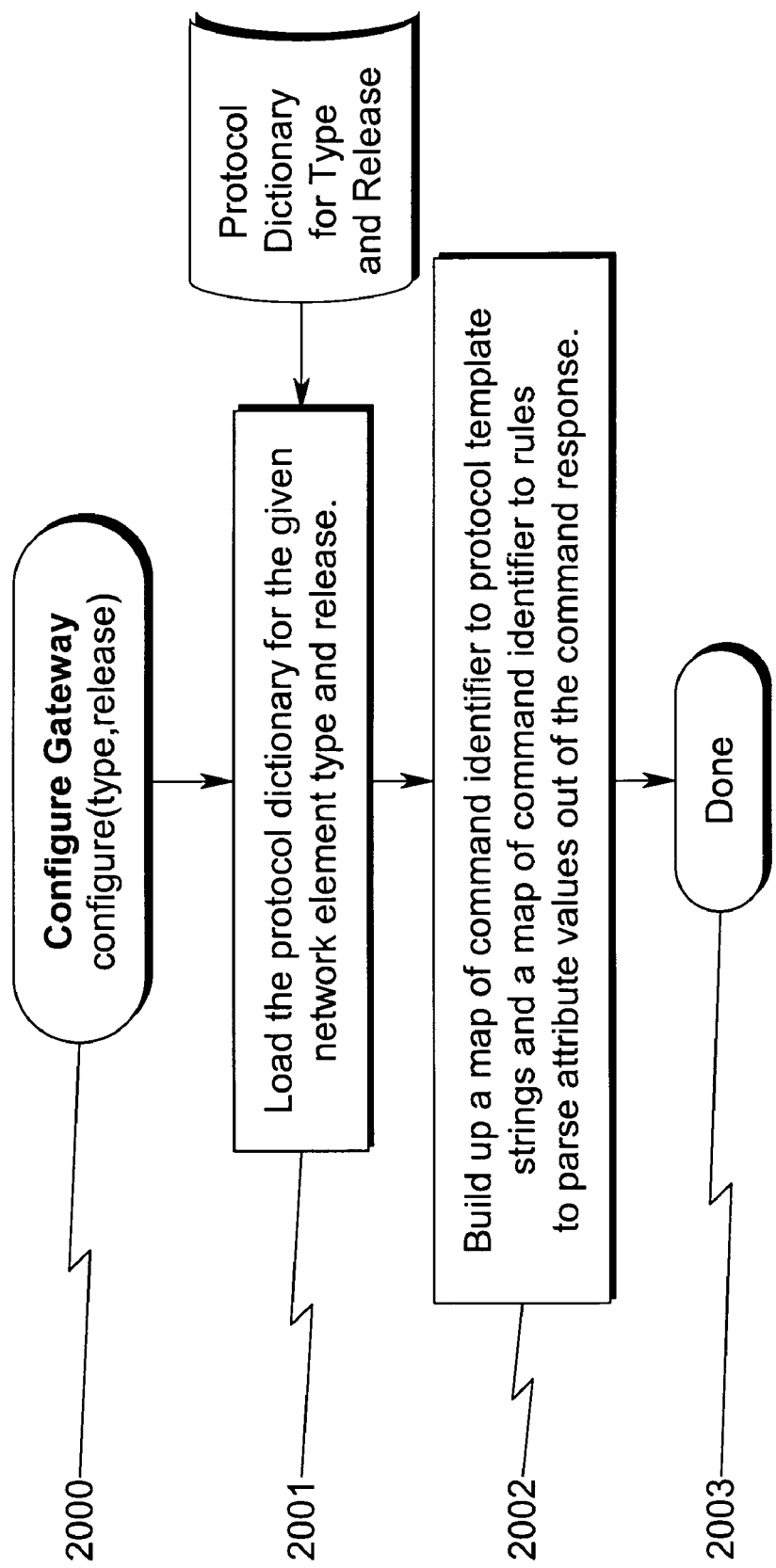
FIG. 20 illustrates an exemplary system flowchart illustrating a Configure Gateway function.

A generalized flowchart for configuring a gateway is illustrated in FIG. 20 (2000). The method generally follows the following steps as detailed in FIG. 20:

1. Instruct the gateway on how to process the protocol dictionary for the given network element type and release (2001).

2. Build up a map of command identifiers to protocol template strings and a map of command identifiers to rules to parse attribute values out of the command response (2002).

One skilled in the art will recognize that these steps may be changed in order or function with no loss of generality.

Set NE Address (2100)

There is one gateway instance per network element. The NE address is set by this function.

Figure 21:
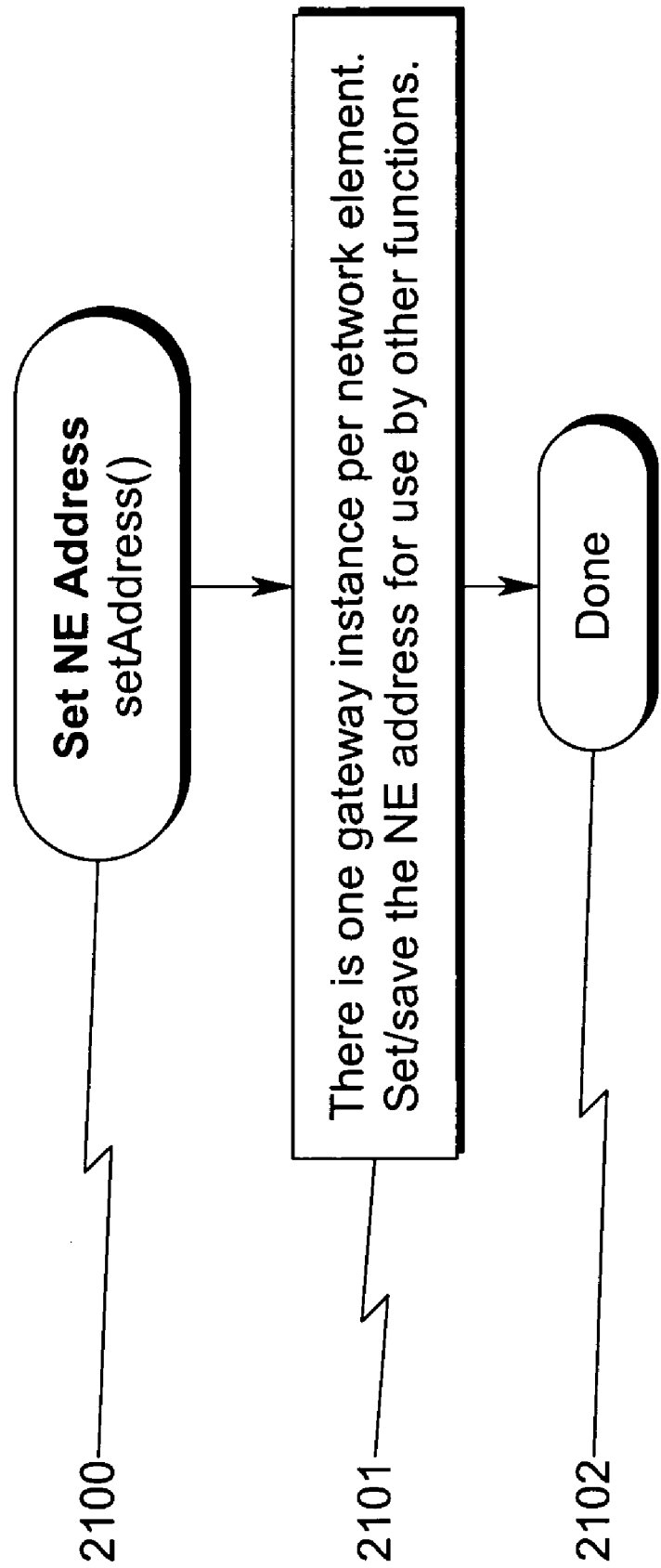
FIG. 21 illustrates an exemplary system flowchart illustrating a Set Network Element Address function.

A generalized flowchart for setting the network element address is illustrated in FIG. 21 (2100). The method generally follows the following steps as detailed in FIG. 21:

1. Set/save the network element address for use by other functions (2101).

One skilled in the art will recognize that these steps may be changed in order or function with no loss of generality.

Connect to NE (2200)

This method establishes a socket connection with the network element on the address set by the previous function. The function starts by setting the network element's communications state to "connecting". Then, the function tries to open a socket connection with the NE. If this fails, the communications state is set to "disconnected" and an exception is thrown. If the socket connection was successfully established, the communications state is set to "connected".

Figure 22:
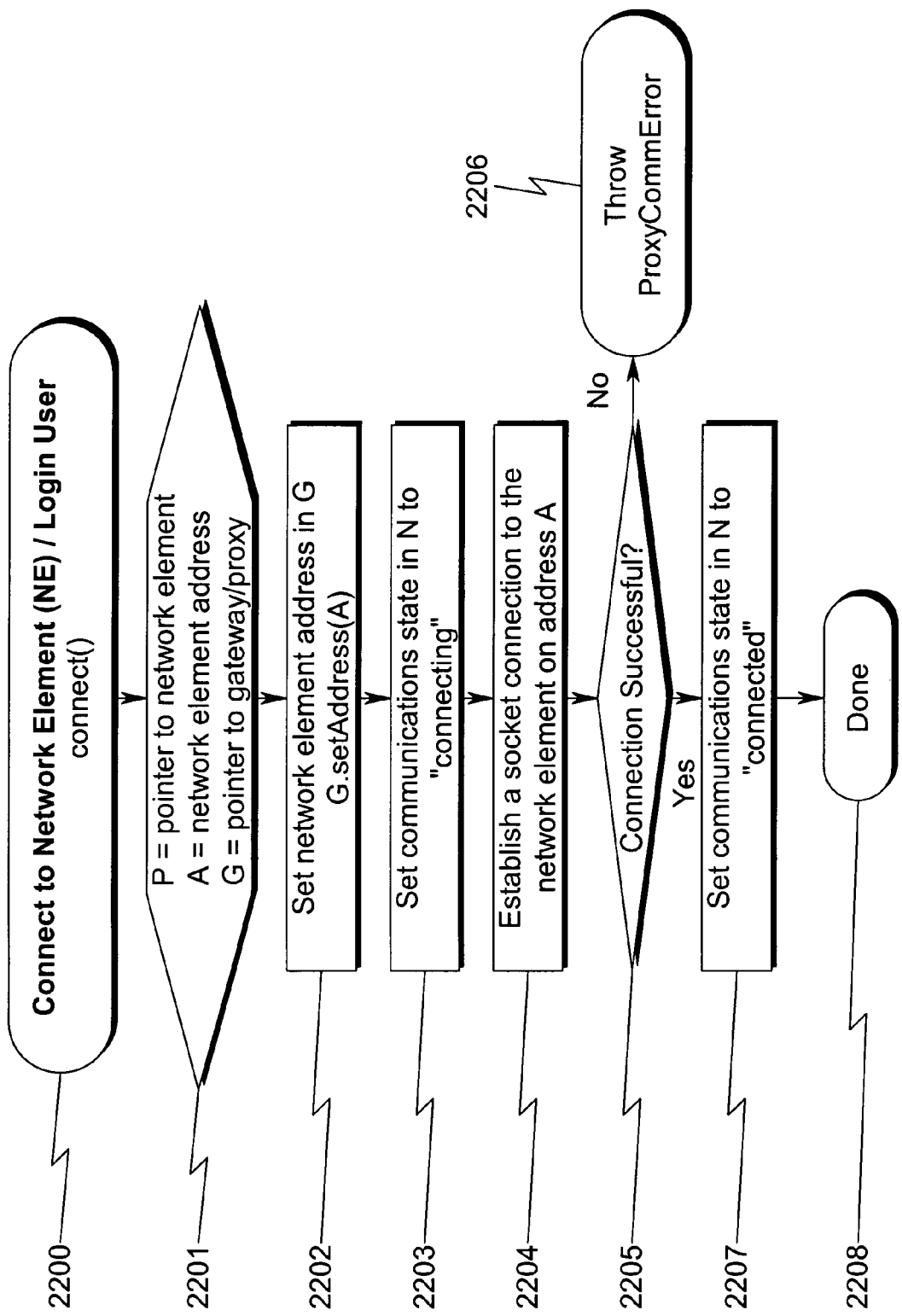
FIG. 22 illustrates an exemplary system flowchart illustrating a Connect to Network Element function.

A generalized flowchart for connection to a network element is illustrated in FIG. 22 (2200). The method generally follows the following steps as detailed in FIG. 22:

1. References to the network element (P), network element address (A), and gateway/proxy (G) are defined (2201).
2. The network element address is set in G (2202).
3. Set the communications state in N to "connecting" (2203).
4. A socket connection to the network element on address A is established (2204).
5. If the connection was successful (2205), then proceed to step 7.
6. Throw a ProxyCommError exception (2206) and exit.
7. Set the communications state in N to "connected" (2207).

One skilled in the art will recognize that these steps may be changed in order or function with no loss of generality.

Disconnect from NE

This method closes the socket connection with the network element associated with this gateway. The function start by setting the network element's communications state to "disconnecting". Then, the function closes the socket connection and sets the communications state to "disconnected".

Figure 23:
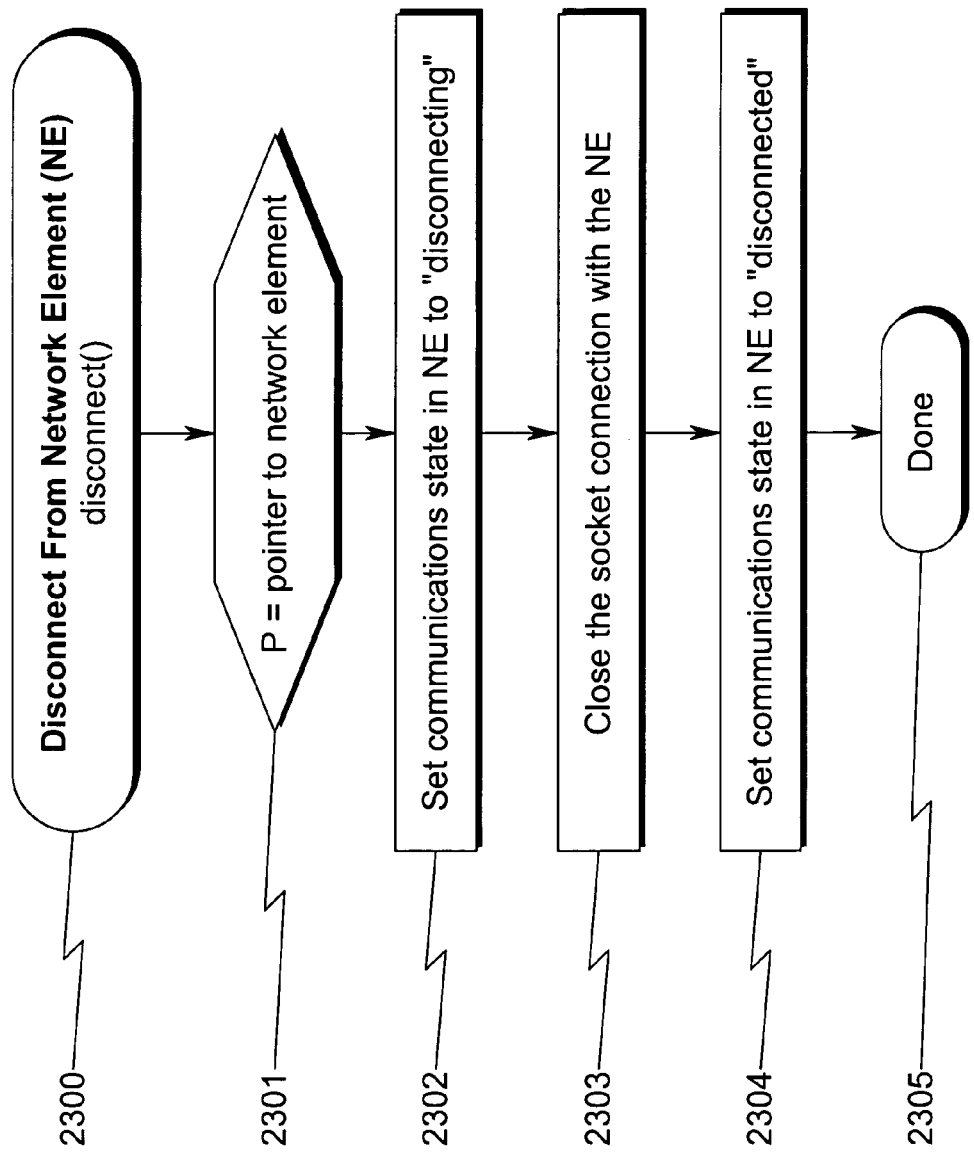
FIG. 23 illustrates an exemplary system flowchart illustrating an Disconnect from Network Element function.

A generalized flowchart for disconnecting from a network element is illustrated in FIG. 23 (2300). The method generally follows the following steps as detailed in FIG. 23:

1. Reference to the network element (P) is defined (2301).
2. Set the communications state in N to "disconnecting" (2302).
3. Close the socket connection to the network element (2303).
4. Set the communications state in N to "disconnected" (2304).

One skilled in the art will recognize that these steps may be changed in order or function with no loss of generality.

Check Connectivity/Ping Cycle (2400)

Once the server is logged in to the network element, a polling cycle continuously monitoring the responsiveness of the network element, is started. (The server logs in to the network element by sending the LOGIN command using the "send command to NE" function). This function uses a timer to periodically send a command with limited overhead (e.g. RTRV-HDR in case of TL1 NEs) to the network element. When the command comes back within a certain configurable time interval, the timer is reset. If the command doesn't come back within this time interval, a communications problem was detected and flagged.

Figure 24:
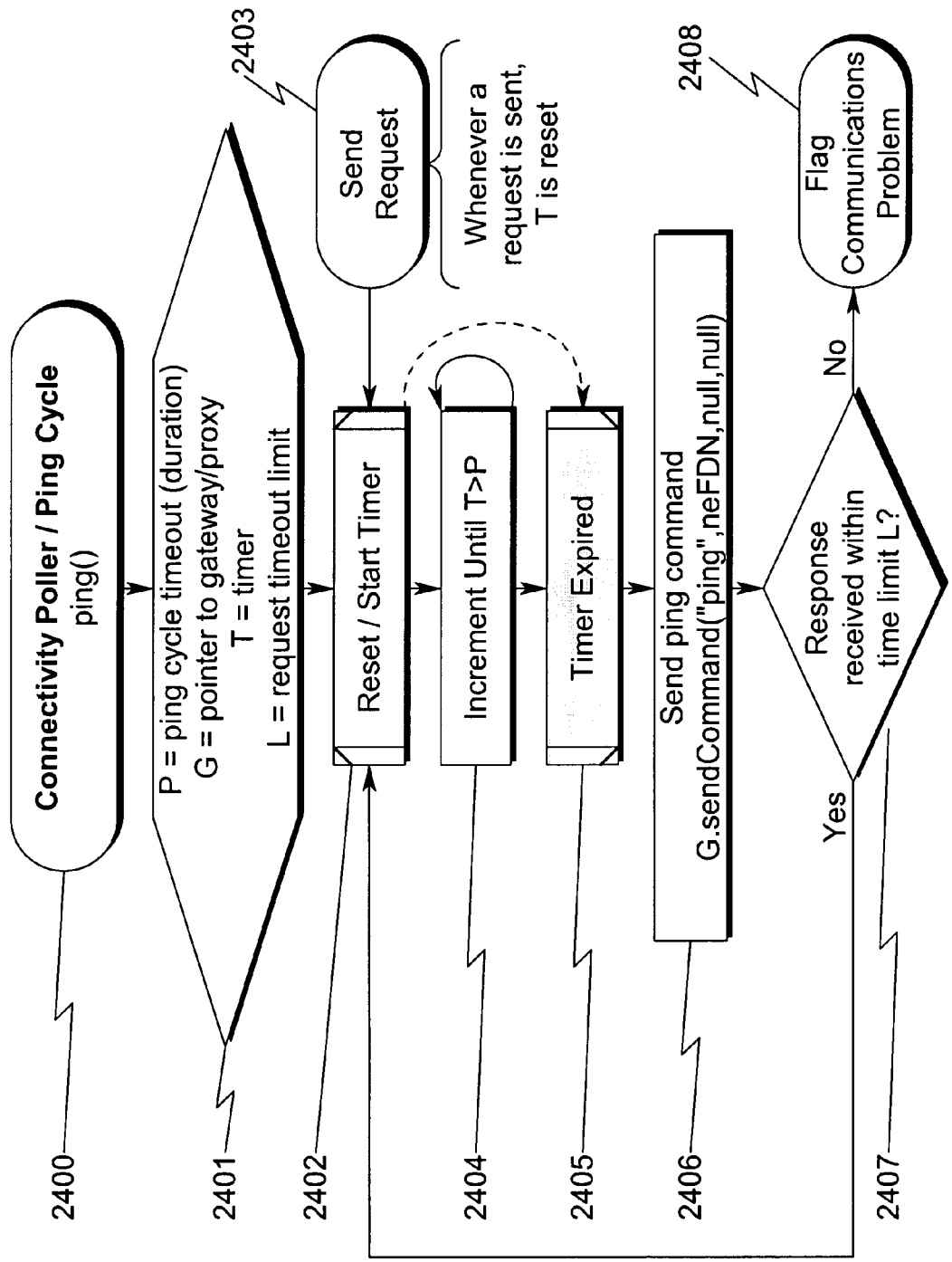
FIG. 24 illustrates an exemplary system flowchart illustrating a Connectivity Poller/Ping Cycle function.

A generalized flowchart for performing this connectivity check/ping cycle is illustrated in FIG. 24 (2400). The method generally follows the following steps as detailed in FIG. 24:

1. References to the ping cycle timeout (duration) (P), gateway/proxy (G), timer (T), and request timeout limit (L) are defined (2401).
2. A timer is reset/started (2402).
3. Send requests (2403) reset the timer in step 2.
4. Timer T is incremented until it is greater than P (2404).
5. If the timer has expired or T>P, then the timing process is terminated (2405). This is an asynchronous event linked to step 3.
6. A ping command is sent (2406).
7. If a response is received within time limit L (2407), then processing proceeds to step 2.
8. A communications problem is flagged as an error (2408).

One skilled in the art will recognize that these steps may be changed in order or function with no loss of generality.

Register Autonomous Message Callback (2500)

Alarms, database change messages, threshold crossing alerts, etc. are all examples of autonomous messages. These messages are spontaneously sent by the NE to the server. As this happens asynchronously, the server needs to register a callback with the gateway. Each time an autonomous message is received by the proxy, the proxy calls the handleMessage( ) method defined in callback object for all registered callbacks.

Figure 25:
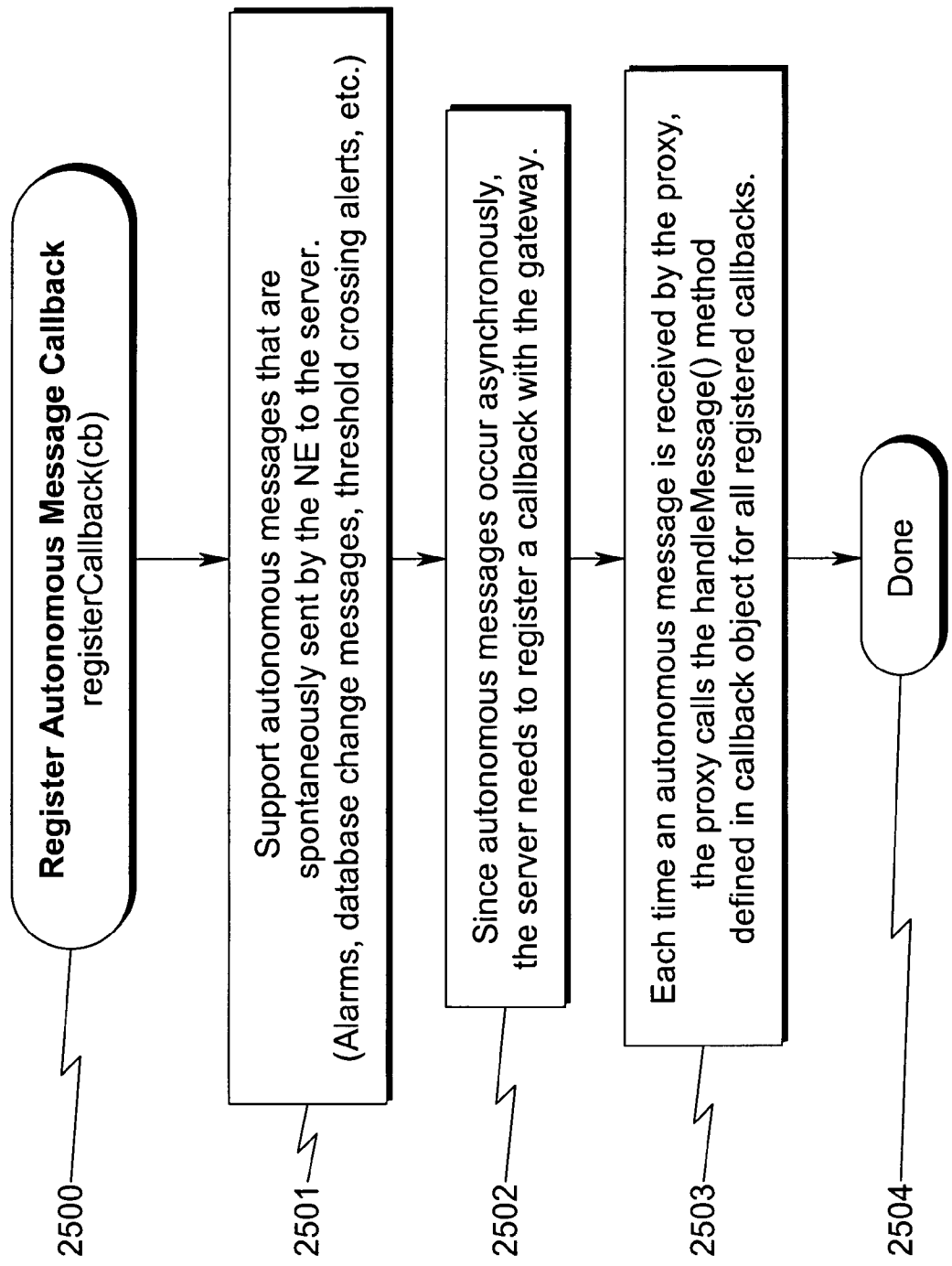
FIG. 25 illustrates an exemplary system flowchart illustrating a Register Autonomous Message Callback function.
Figure 26:
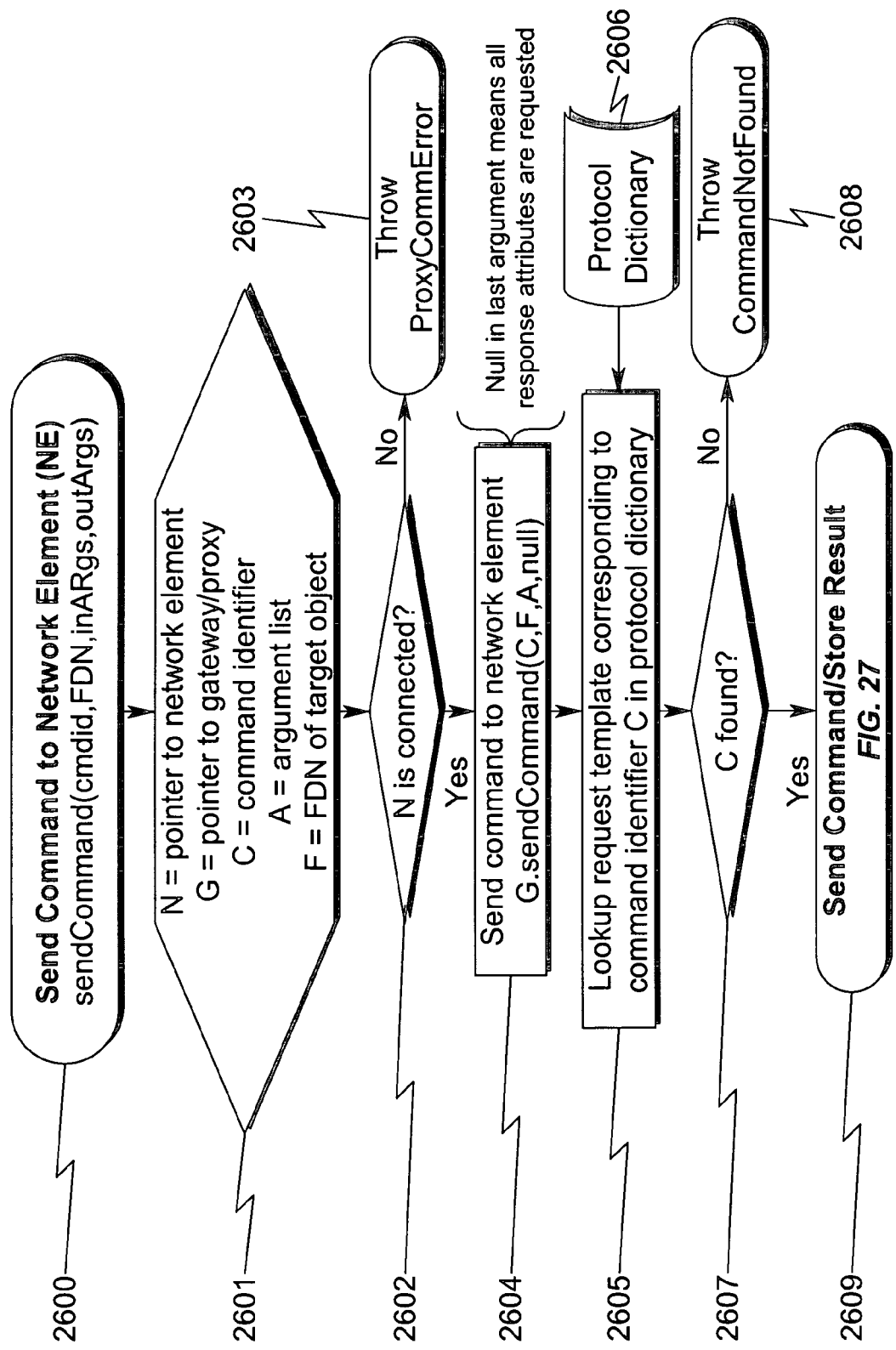
FIGS. 26–27 illustrates an exemplary system flowchart illustrating a Send Command to Network Element function.
Figure 27:
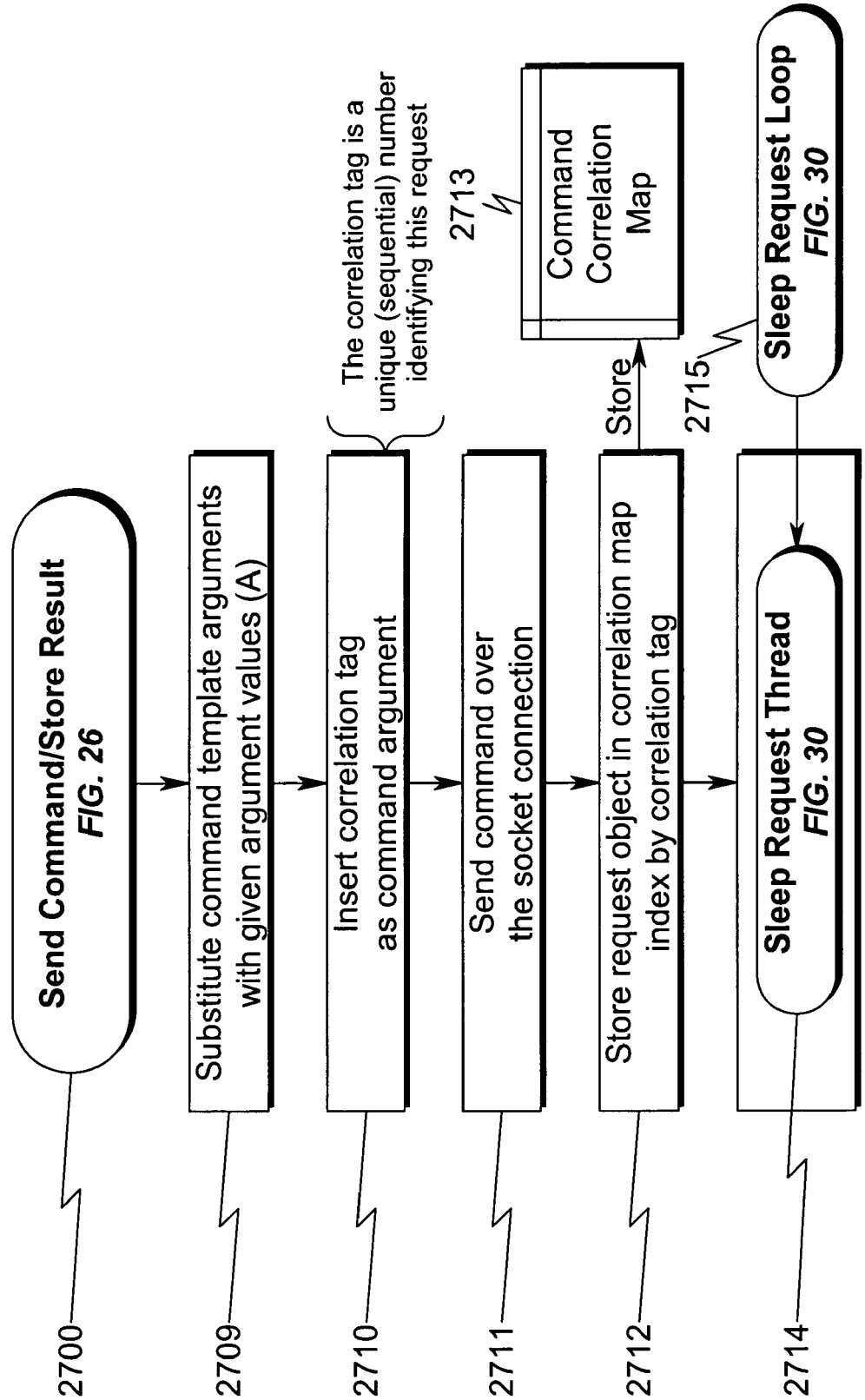

A generalized flowchart for registering autonomous message callbacks is illustrated in FIG. 25 (2500). The method generally follows the following steps as detailed in FIG. 25:

1. Provide support for autonomous messages that are spontaneously sent by the NE to the server (2501).
2. Register a callback with the gateway (2502).
3. Each time an autonomous message is received by the proxy, the proxy calls the handleMessage( ) method defined in the callback object for all registered callbacks (2503).

One skilled in the art will recognize that these steps may be changed in order or function with no loss of generality.

Send Command to NE (2600)

This function sends the command associated with the given command identifier and the given command-input arguments to the object identified by the given FDN. The command also takes the list of expected output arguments as input. The function first checks if the communications state is currently "connected". If not, an exception is thrown. The function searches for the given command identifier in the protocol dictionary. If the command identifier was not found, the CommandNotFound exception is thrown. Else, the command template associated with the command identifier is retrieved from the protocol dictionary. The function then replaces the placeholders in the command template with the given values for the corresponding attributes. The function then generates a unique (sequential) number that will act as the unique identification for the command execution. The placeholder for the CTAG attribute is replaced by this unique number. The command response sends this unique number back, so that the system can correlate the response with a command in a multi-threaded environment with asynchronous command executions. The function sends the command over the socket connection and stores the command in a correlation map. The current thread is put to sleep.

In the meantime, another thread is continuously monitoring the socket for incoming messages (autonomous messages and command responses). When a message comes in, a sequence of characters is read from the socket until a pre-defined termination character is read (';' in case of TL1). The termination character defines the end of a message. The message type is extracted. This type identifies the message as an autonomous message or as a command response. If the message is an autonomous message, the registered callback's handleMessage( ) method is called (see registercallback( ) function) for processing. If the message corresponds to a command response, the correlation tag is extracted from it and the correlation map is searched for the presence of this tag. If the tag is not present, this message is discarded. If the tag was found, the corresponding command object is retrieved from the map. The command's response is added to the command object and all sleeping threads are notified. This wakes up a randomly selected send-thread. The awoken thread checks whether his command object now has the response set. If so, the function returns the response. Otherwise, the thread is put back to sleep and the next randomly selected send-thread is awoken until no more send-threads are available.

A generalized flowchart for sending commands to a network element is illustrated in FIGS. 26–30 (2600). The method generally follows the following steps as detailed in FIGS. 26–30:
1. References to the network element (N), gateway/proxy (G), command identifier (C), argument list (A), and FDN of the target object (F) are defined (2601).
2. If N is connected (2602), proceed to step 4.
3. Throw a ProxyCommError (2603) and exit.
4. Send the command to the network element (2604).
5. Lookup the request template corresponding to the command identifier C in the protocol dictionary (2605).
6. Read the protocol dictionary (2606) to implement step 5.
7. If command C was found, proceed to the send command/store result flowchart of FIG. 27 (2700).
8. Throw a CommandNotFound exception (2608).
9. Substitute command template arguments with given argument values (A) (2709).
10. Insert correlation tag as the command argument (2710).
11. Send the command over the socket connection (2711).
12. Store the request object in the correlation map index by correlation tag (2712).
13. Utilize a command correlation map to implement step 12 (2713).
14. Execute a sleep request thread (2714) of FIG. 30.

One skilled in the art will recognize that these steps may be changed in order or function with no loss of generality.

Retrieve Command Response From NE (2800)

Figure 28:
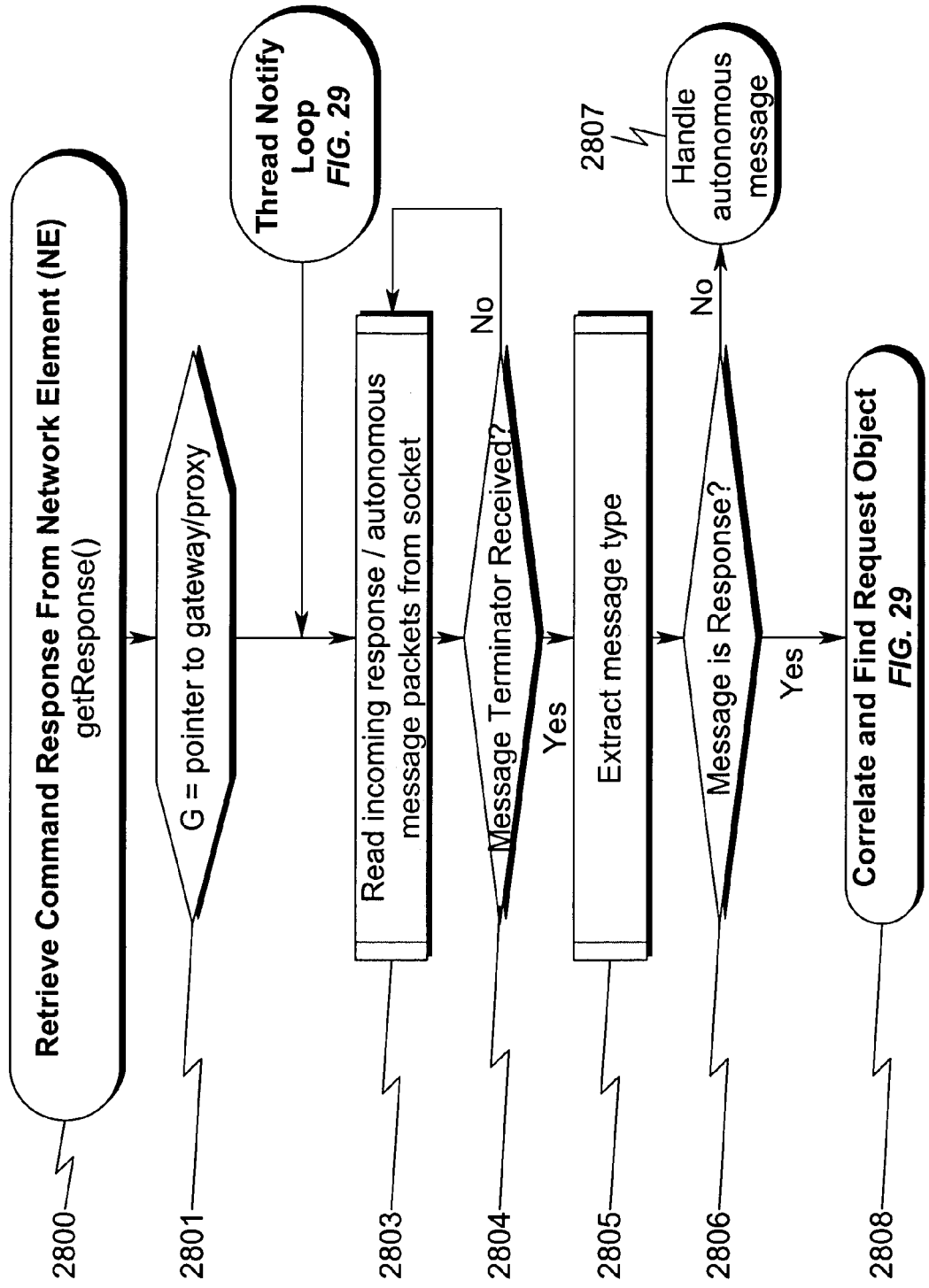
FIGS. 28–29 illustrates an exemplary system flowchart illustrating a Retrieve Command Response from Network Element function.
Figure 29:
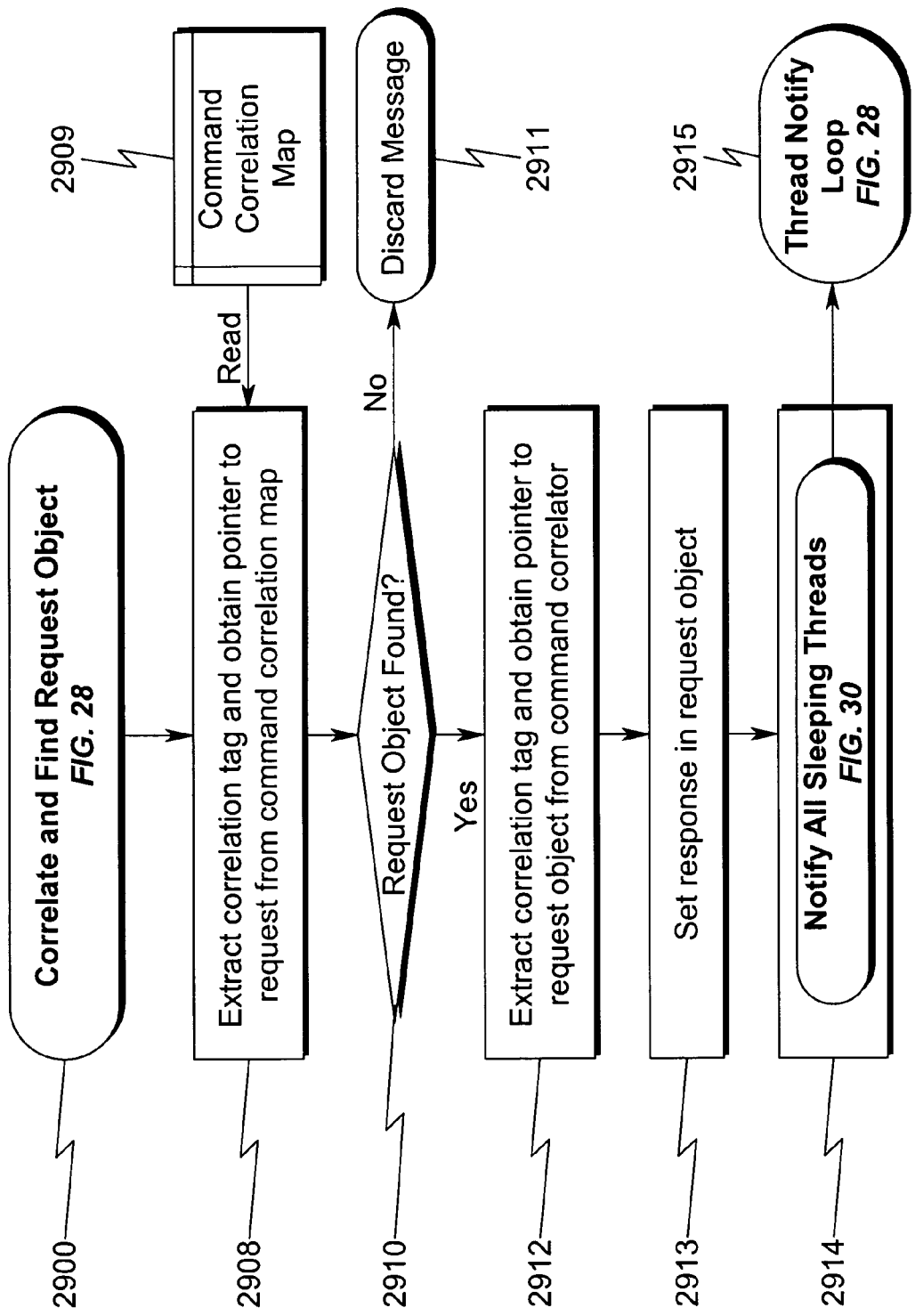
Figure 30:
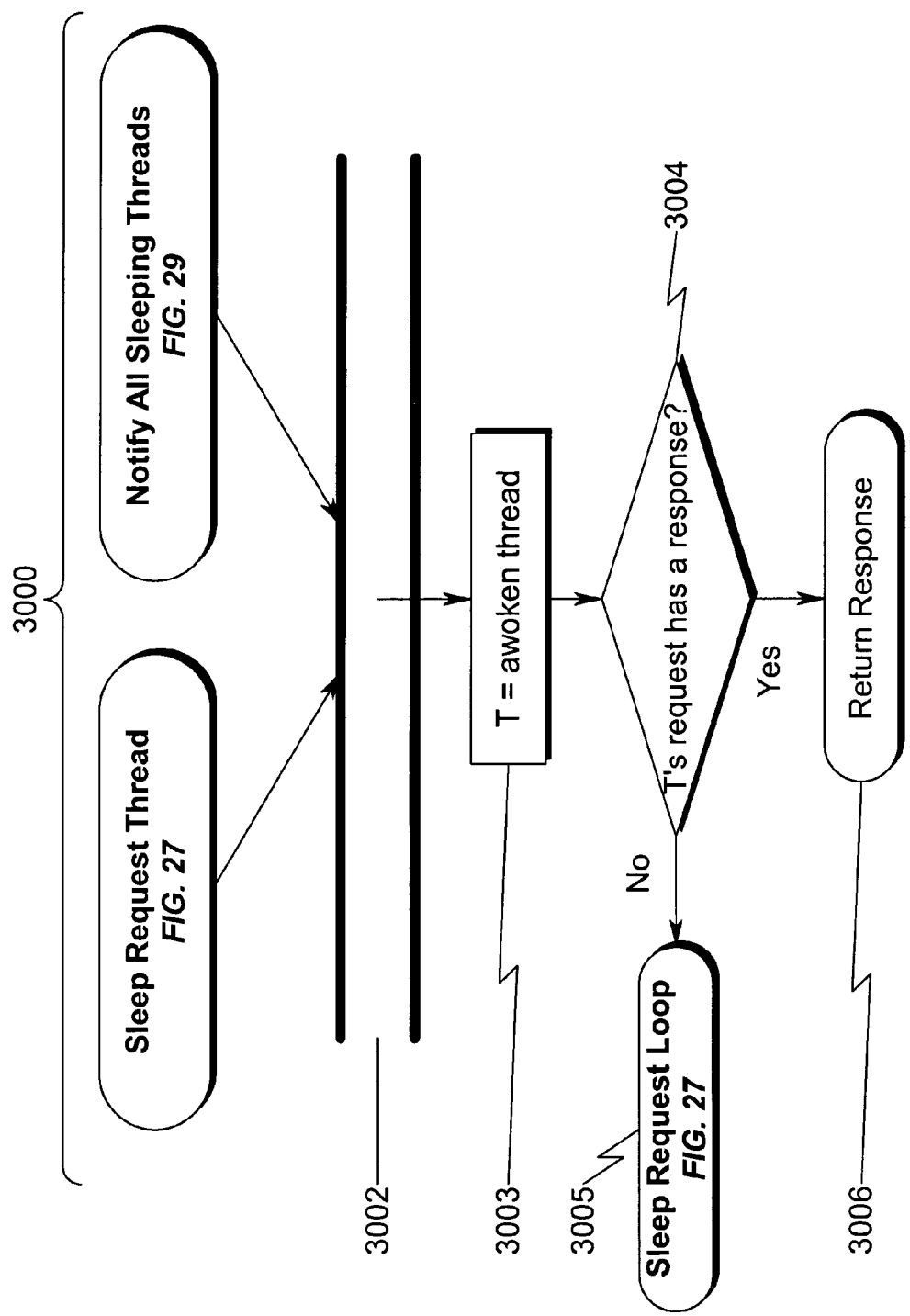
FIG. 30 illustrates an exemplary system flowchart illustrating a Request Thread Processing function.

A generalized flowchart for retrieving command responses from a network element is illustrated in FIGS. 28–30 (2600). The method generally follows the following steps as detailed in FIGS. 28–30:
1. Reference to the gateway/proxy (G) is defined (2801).
2. An entrypoint for thread loop cycling is defined (2802)
3. Incoming response/autonomous message packets are read (2803).
4. Step 2 is repeated until a message terminator is received (2804).
5. The message type is extracted (2805).
6. If the message is a response (2806), control is passed to the Correlate and Find Request Object entry in FIG. 29 of step 8.
7. Otherwise, an autonomous message is handled (2807).
8. The correlation tag is extracted and a pointer is obtained to the request from the command correlation map (2908).
9. A command correlation map is used in the extraction process of step 8 (2909).
10. If the requested object is found (2910), control passes to step 12.
11. Otherwise, the message is discarded (2911).
12. The correlation tag is extracted to obtain a pointer the request object from the command correlator (2912).
13. The response is set in the request object (2913).
14. All sleeping threads are notified (2914) as indicated in FIG. 30 and the thread notify loop (2915) is activated in FIG. 28 (2802).

One skilled in the art will recognize that these steps may be changed in order or function with no loss of generality.

Processing Sleep Request Threads (3000)

Processing of sleep request threads associated with sending and retrieving network element commands is illustrated in FIG. 30 (3000).

PREFERRED SYSTEM CONTEXT OF THE PRESENT INVENTION

While the present invention may be best applied to situations in which telecommunications networks are to be managed and maintained either locally or remotely using graphical user interface (GUI) based operator consoles, the present invention also has wide applicability in situations in which any type of hardware and/or software component in a computer network is to be managed in a uniform way with minimal software design complexity and maintenance costs.

The functional elements of the present invention are widely applicable to situations involving multiple types of remote equipment sourced from a variety of hardware and software manufacturers. Since the present invention breaks the compile-time link between network element management and the tool used to perform the management function, this permits a wide variety of applications in situations where networks must be grown dynamically by adding hardware and software, but which must remain up and functional during this upgrade process.

CONCLUSION

An Element Manager Common Gateway Architecture (CGA) system and method incorporating a client/server architecture in which a network Element Management System (EMS) takes the role of "client" and the protocol gateways/proxies take the role of "server" has been disclosed. The EMS defines all protocol-independent application logic while the gateways/proxies deal exclusively with protocol-specific knowledge. The Common Gateway Architecture (CGA) allows the application logic to be shared among protocols, using a protocol independent data model. A significant aspect of the software maintenance in EMS systems is that since network elements (NEs) use many different protocols, there exists a difficulty and time lag associated with customizing a common network element manager for every network element using a different protocol in a given system. Modifications to the system typically require incorporation of new code into the network element manager with associated recompilation of the entire network element manager subsystem. The present invention solves this problem by using a common gateway architecture designed to be generic across different types of NEs and different network protocols. This permits NEs to be added incrementally without recompilation of the entire network element manager, thus reducing overall software maintenance overhead.

Although a preferred embodiment of the present invention has been illustrated in the accompanying Drawings and described in the foregoing Detailed Description, it will be understood that the invention is not limited to the embodiments disclosed, but is capable of numerous rearrangements, modifications, and substitutions without departing from the spirit of the invention as set forth and defined by the following claims.

What is claimed is:

1. An element manager common gateway architecture (CGA) system comprising:
   a gateway/proxy layer means, said gateway/proxy layer means includes an add network element means and includes a delete network element means; wherein
   said gateway/proxy layer means translates generic CGA commands to network element protocols;
   said gateway/proxy layer means translates the network element protocols to at least one of a CGA object and CGA attributes;
   said gateway/proxy layer means permits bi-directional communication between an element management system and a network element using said translations;
   a personal computer (PC) for implementing at least a portion of the element manager CGA system, said PC utilizing a graphical user interface, with the graphical user interface utilizing at least one of a HP-UX™ operating environment, a LINUX™ operating environment, a SOLARIS™ operating environment, a UNIX™ operating environment, and a Microsoft® Windows™ operating environment;
   a configure gateway means;
   a set network element address means;
   a connect to network element means;
   a disconnect from network element means;
   a check connectivity means;
   a register autonomous message callback means;
   a send command to network element means; and
   a retrieve command response from network element means.

2. The element manager common gateway architecture system of claim 1 wherein said gateway/proxy layer means and said network element reside on separate nodes within a computer network.

3. The element manager common gateway architecture system of claim 1 wherein one or more components of said system is implemented within an application programming interface (API).

4. The element manager common gateway architecture system of claim 1 wherein one or more components of said system is implemented within a web browser.

5. The element manager common gateway architecture system of claim 1 wherein said communication occurs over the Internet.

6. The element manager common gateway architecture system of claim 1 wherein said gateway/proxy layer means and said network element reside on separate nodes within a computer network.

7. The element manager common gateway architecture system of claim 1 wherein one or more components of said system is implemented within an application pro ng interface (API).

8. The element manager common gateway architecture system of claim 1 wherein one or more components of said system is implemented within a web browser.

9. The element manager common gateway architecture system of claim 1 wherein said communication occurs over the Internet.

* * * * *